US012264295B2

(12) United States Patent
Struillou et al.

(10) Patent No.: US 12,264,295 B2
(45) Date of Patent: Apr. 1, 2025

(54) ENCAPSULATED PRO-PERFUME COMPOUNDS

(71) Applicant: FIRMENICH SA, Satigny (CH)

(72) Inventors: Arnaud Struillou, Satigny (CH); Estelle Rassat, Satigny (CH)

(73) Assignee: FIRMENICH SA, Satigny (CH)

( * ) Notice: Subject to any disclaimer, the term of this patent is extended or adjusted under 35 U.S.C. 154(b) by 691 days.

(21) Appl. No.: 17/439,942

(22) PCT Filed: Mar. 20, 2020

(86) PCT No.: PCT/EP2020/057767
§ 371 (c)(1),
(2) Date: Sep. 16, 2021

(87) PCT Pub. No.: WO2020/188079
PCT Pub. Date: Sep. 24, 2020

(65) Prior Publication Data

US 2023/0032098 A1 Feb. 2, 2023

(30) Foreign Application Priority Data

Mar. 20, 2019 (EP) .................................... 19163967

(51) Int. Cl.
*C11B 9/00* (2006.01)
*C11D 3/50* (2006.01)

(52) U.S. Cl.
CPC .......... *C11B 9/0034* (2013.01); *C11B 9/0019* (2013.01); *C11B 9/0061* (2013.01)

(58) Field of Classification Search
CPC ... C11B 9/0019; C11B 9/0061; C11B 9/0034; C11D 3/507; C11D 3/505
USPC .......................................................... 512/4, 1
See application file for complete search history.

(56) References Cited

U.S. PATENT DOCUMENTS

2003/0171250 A1 9/2003 Smets et al.
2017/0335234 A1* 11/2017 Wu ....................... C11B 9/0015

FOREIGN PATENT DOCUMENTS

EP 1116788 A1 7/2001
WO 9734578 A1 9/1997
WO WO-0238120 A1 * 5/2002 ........... A61K 8/0229

OTHER PUBLICATIONS

International Search Report and Written Opinion for corresponding PCT/EP2020/057767 mailed Jun. 29, 2020, 13 Pages.

* cited by examiner

*Primary Examiner* — Jessica Whiteley
(74) *Attorney, Agent, or Firm* — Armstrong Teasdale LLP

(57) ABSTRACT

Described herein is a fragrance delivery system including a perfume oil and a carrier material, where the perfume oil includes at least one pro-perfume compound and where the perfume oil is dispersed in or absorbed within the carrier material. Also described herein are compositions and perfumed products including the same.

19 Claims, 1 Drawing Sheet

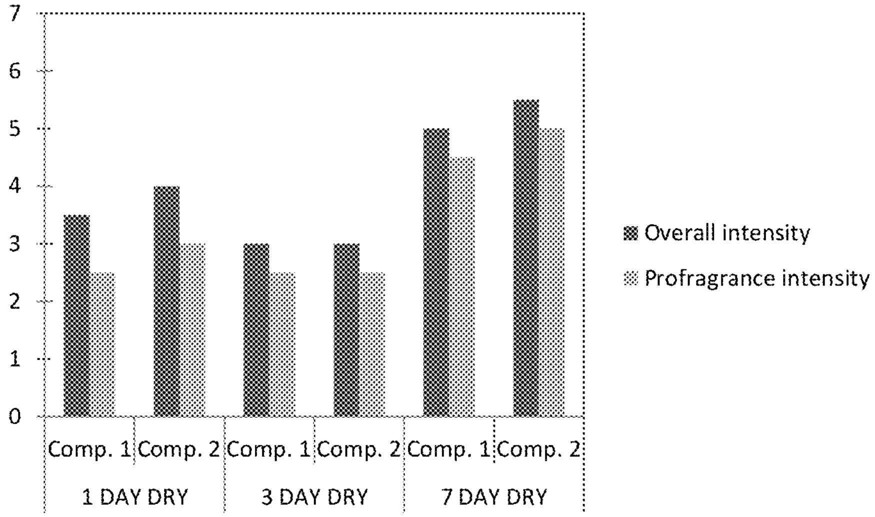
7
6
5
4
3
2
1
0
Comp. 1
Comp. 2
Comp. 1
Comp. 2
Comp. 1
Comp. 2
1 DAY DRY
3 DAY DRY
7 DAY DRY
Overall intensity
Profragrance intensity

ENCAPSULATED PRO-PERFUME COMPOUNDS

CROSS-REFERENCE TO RELATED APPLICATIONS

This application is a U.S. National Phase Application of International Patent Application No. PCT/EP2020/057767, filed Mar. 20, 2020, which claims priority to European Patent Application No. 19163967.3, filed Mar. 20, 2019, the entire contents of which are hereby incorporated by reference herein.

TECHNICAL FIELD

The present invention relates to a fragrance delivery system comprising a perfume oil and a carrier material, wherein the perfume oil comprises at least one pro-perfume compound and wherein the perfume oil is dispersed in or absorbed within the carrier material as well as perfuming compositions and perfumed consumer products comprising the same.

BACKGROUND OF THE INVENTION

Pro-perfume compounds are known to a skilled person and provide a release of a perfuming ingredient, in particular an olfactive perfuming ingredient, upon trigger with an external stimulus, such as upon contact with moisture and/or exposure to light and/or increased temperature and/or oxidative environment and a certain control of the kinetics of fragrance release to induce sensory effects through sequential release.

In certain applications, such as machine wash/laundry powder detergent and hand wash powder detergent, perfuming ingredients such as inter alia pro-perfume compounds tend to be stored for long periods of time and/or under harsh conditions, such as under exposure to light and/or at increased temperature and/or in oxidative environment, so that the perfuming ingredient is degraded and the pro-perfume compound is converted to the olfactive perfuming ingredient prematurely without being in contact with the intended locus, such as a fabric.

WO 03/049666 A2 describes certain pro-perfume compounds but does not disclose or suggest its use in a fragrance delivery system according to the present invention.

There is a need to provide a fragrance delivery system which provides improved stability for the pro-perfume compounds, in particular in powder detergents, and/or additional control on the kinetics of the fragrance release of the pro-perfume compounds upon application.

The prior art does not disclose or suggest a fragrance delivery system according to the present invention providing improved stability for the pro-perfume compounds, in particular in solid cleaning products such as powder detergents, and/or providing additional control of the kinetics of fragrance release of the pro-perfume compounds upon application, for example to induce sensory effects through sequential release.

SUMMARY OF THE INVENTION

The present invention relates to a fragrance delivery system comprising a perfume oil and a carrier material, wherein the perfume oil comprises at least one pro-perfume compound and wherein the perfume oil is dispersed in or absorbed within the carrier material.

BRIEF DESCRIPTION OF THE DRAWINGS

FIG. 1 depicts test results where the intensity of the perception of the perfume on dried towels treated with the scent booster compositions 1 and 2 was evaluated by a panel of 6 to 8 trained panelists.

DESCRIPTION OF THE INVENTION

By "fragrance delivery system" is understood the encapsulation of fragrances or perfumes into carrier materials to provide protection against aging, enhance impact during use and sustained-release from substrates.

By "dispersed in or absorbed within", it is meant that the perfume is entrapped within a matrix formed by the carrier material. By contrast, "microcapsule" or "core-shell microcapsule" refers to a delivery system comprising an oil-based core of a hydrophobic active ingredient encapsulated by a polymeric shell. In other words, the delivery system of the present invention is not in a form of a core-shell microcapsule but in a form of a granule also called a particle.

In a preferred embodiment, the fragrance delivery system is a solid fragrance delivery system.

Typically, a particle has a median volume-weighted particle size from 5 to 500 μm, preferably 6 to 300 μm and more preferably 10 to 100 μm. The median volume-weighted particle size of particles can be measured by Optical Microscopy and Light Scattering (Mastersizer 3000, Malvern).

According to the present invention, the fragrance delivery system comprises a perfume.

By "perfume oil" (or also "perfume") what is meant here is an ingredient or composition that is a liquid at about 20° C. According to any one of the above embodiments said perfume oil may also be called a perfume and can be a perfuming ingredient or fragrance ingredient alone or a mixture of ingredients in the form of a perfuming composition. The term perfuming ingredient or fragrance ingredient is understood as a compound which is used as an active ingredient in perfuming preparations or compositions in order to impart a hedonic effect. In other words, a compound to be considered as being a perfuming ingredient, must be recognized by a skilled person in the art of perfumery as being able to impart or modify in a positive or pleasant way the odor of a composition, and not just as having an odor. The nature and type of the perfuming co-ingredients do not warrant a more detailed description here, which in any case would not be exhaustive, the skilled person being able to select them on the basis of his general knowledge and according to intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or *sulphurous* heterocyclic compounds and essential oils, and said perfuming co-ingredients can be of natural or synthetic origin. The perfuming ingredient can be of natural or synthetic origin. Many of these perfuming ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery.

In particular such perfume oil may comprise also solvents and adjuvants of current use in perfumery.

By "solvents of current use in perfumery", it is meant here a material which is practically neutral from a perfumery point of view, i.e. that does not significantly alter the organoleptic properties of perfuming ingredients and is generally not miscible with water, i.e. possesses a solubility in water below 10%, or even below 5%. Solvents commonly used in perfumery, such as for example dipropyleneglycol, diethyl phthalate, isopropyl myristate, benzyl benzoate, 2-(2-ethoxyethoxy)-1-ethanol or ethyl citrate, limonene or other terpenes, isoparaffins such as those known under the trademark Isopar® (origin: Exxon Chemical) or glycol ethers and glycol ether esters such as those known under the trademark Dowanol® (origin: Dow Chemical Company), are suitable solvents for the purposes of the invention.

By "adjuvants of current use in perfumery" it is meant here an ingredient capable of imparting additional added benefits such as a color, chemical stability, etc. A detailed description of the nature and type of adjuvant commonly used in perfuming bases cannot be exhaustive, but it has to be mentioned that said ingredients are well known to a person skilled in the art.

According to any one of the above embodiments, the perfume oil may be partly encapsulated in a core-shell microcapsule. The nature of the polymeric shell of the microcapsules of the invention can vary. As non-limiting examples, the shell can be made of a material selected from the group consisting of polyurea, polyurethane, polyamide, polyacrylate, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

According to the present invention, the perfume oil comprises at least one pro-perfume compound.

Pro-perfume compounds are known to a skilled person and provide a release of a perfuming ingredient, in particular an olfactive perfuming ingredient, upon trigger with an external stimulus, such as upon contact with moisture and/or exposure to light and/or increased temperature and/or oxidative environment and provide a certain control of the kinetics of fragrance release to induce sensory effects through sequential release.

In a preferred embodiment, the perfume oil comprises 1 to 5 pro-perfume compounds, more preferably 1 to 3 pro-perfume compounds. Thereby, it is understood that the perfume oil comprises 1 to 5 structurally different pro-perfume compounds, more preferably 1 to 3 structurally different pro-perfume compounds.

In a preferred embodiment, the pro-perfume compound according to the present invention is a storage-labile pro-perfume compound.

By "storage-labile" it is understood that over extensive storage in the perfumed consumer product, the pro-perfume compound decomposes or degrades over time and at a rate deemed unacceptable for providing a long term olfactive effect, thus preventing its effective use.

In a preferred embodiment, the pro-perfume compound is a temperature-labile, photo-labile, moisture-labile, enzymatic-labile and/or oxygen-labile pro-perfume compound, more preferably a temperature-labile, moisture-labile and/or oxygen-labile pro-perfume compound, even more preferably a temperature-labile and/or oxygen-labile pro-perfume compound and most preferably an oxygen-labile pro-perfume compound.

According to any above embodiment, the pro-perfume compound according to the present invention is a profragrance:

- obtained by a Michael-type addition and releasing an odoriferous α,β-unsaturated ketone, aldehyde or carboxylic ester, such as but not limited to the one reported in WO200304966, EP1460994, WO2013139766, U.S. Pat. No. 9,758,749, EP10904541, EP2074154, U.S. Pat. Nos. 9,765,282, 9,902,920, WO2016131694, WO200002991, WO200146373; the content with regard to pro-fragrance compounds of each aforementioned document is incorporated herein by reference;
- comprising an imine functional group and being a moisture-labile compound, such as but not limited to the one reported in WO2018134410, EP3192566; the content with regard to pro-fragrance compounds of each aforementioned document is incorporated herein by reference;
- comprising a cinnamyl ether functional group and being an oxygen-labile compound, such as but not limited to the one reported in U.S. Pat. No. 9,718,752, US20180016521; the content with regard to pro-fragrance compounds of each aforementioned document is incorporated herein by reference;
- comprising enol-ether functional group and being an oxygen-labile compound; such as but not limited to the one reported in WO2019243501, the content with regard to pro-fragrance compounds of each aforementioned document is incorporated herein by reference;
- comprising an alpha-ketoester functional group and being a photo-labile compound, such as but not limited to the one reported in EP1082287, EP2748208; the content with regard to pro-fragrance compounds of each aforementioned document is incorporated herein by reference,
- comprising one or two ester functional group and being an enzymatic-labile compound, such as but not limited to the one reported in WO199504809; the content with regard to pro-fragrance compounds of the aforementioned document is incorporated herein by reference,
- comprising α,β-unsaturated ester and being a light-labile compound, such as but not limited to the one reported in EP0936211; the content with regard to pro-fragrance compounds of the aforementioned document is incorporated herein by reference;
- comprising a Knoevenagel adduct and being a moisture-labile compound, such as but not limited to the one reported in WO2006076821, WO2007143873, WO2016074699, WO2016091894, WO2018096176; the content with regard to pro-fragrance compounds of each aforementioned document is incorporated herein by reference;
- comprising azadioxabicyclooctanes and being moisture-labile compound, such as but not limited to those reported in WO2007087977, WO2010105874; the content with regard to pro-fragrance compounds of each aforementioned document is incorporated herein by reference;
- comprising siloxanes and being moisture-labile compounds, such as but not limited to those reported in WO2000014091; the content with regard to pro-fragrance compounds of the aforementioned document is incorporated herein by reference.

When pro-fragrance obtained by a Michael-type addition is used, the perfumed consumer product may also comprise zinc ricinoleate, laureth-3, tetrahydroxypropyl ethylnediamine, propylene glycol or a mixture thereof.

In a preferred embodiment, the pro-perfume compound is a compound of formula (I)

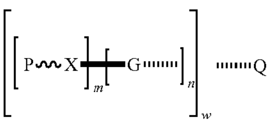

wherein:

a) w represents an integer from 1 to 10000;

b) n represents 1 or 0;

c) m represents an integer from 1 to 4;

d) P represents a hydrogen atom or a radical susceptible of generating an odoriferous α,β-unsaturated ketone, aldehyde or carboxylic ester and is represented by the formula (II)

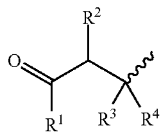

in which the wavy line indicates the location of the bond between said P and X;

$R^1$ represents a hydrogen atom, a $C_1$ to $C_6$ alkoxyl radical or a $C_1$ to $C_{15}$ linear, cyclic or branched alkyl, alkenyl or alkadienyl radical, possibly substituted by $C_1$ to $C_4$ alkyl groups; and $R^2$, $R^3$ and $R^4$ represent a hydrogen atom, an aromatic ring or a $C_1$ to $C_{15}$ linear, cyclic or branched alkyl, alkenyl or alkadienyl radical, possibly substituted by $C_1$ to $C_4$ alkyl groups; or two, or three, of the groups $R^1$ to $R^4$ are bonded together to form a saturated or unsaturated ring having 5 to 20, preferably 6 to 20, carbon atoms and including the carbon atom to which said $R^1$, $R^2$, $R^3$ or $R^4$ groups are bonded, this ring being possibly substituted by $C_1$ to $C_8$ linear, branched or cyclic alkyl or alkenyl groups; and with the proviso that at least one of the P groups is of the formula (II) as defined hereinabove;

e) X represents a functional group selected from the group consisting of the formulae i) to xiv):

i)

ii)

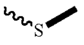

iii)

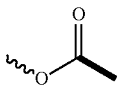

iv)

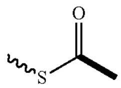

v)

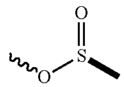

-continued vi)

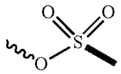

vii)

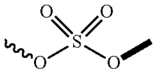

viii)

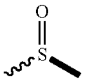

ix)

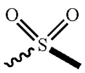

x)

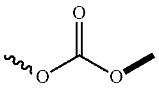

xi)

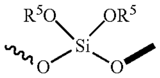

xii)

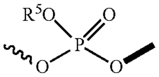

xiii)

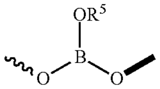

xiv)

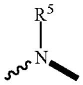

in which formulae the wavy lines are as defined previously and the bold lines indicate the location of the bond between said X and G, and $R^5$ represents a hydrogen atom, a $C_1$ to $C_{22}$, saturated or unsaturated, alkyl group or an aryl group, possibly substituted by $C_1$ to $C_6$ alkyl or alkoxyl groups or halogen atoms; and with the proviso that X may not exist when P represents a hydrogen atom;

f) G represents a multivalent radical (with a m+1 valence) derived from an aryl radical, possibly substituted, or a divalent cyclic, linear or branched alkyl, alkenyl, alkadienyl or alkylbenzene hydrocarbon radical having from 1 to 22, preferably 6 to 22, carbon atoms, or a tri-, tetra- or pentavalent cyclic, linear or branched alkyl, alkenyl, alkadienyl or alkylbenzene hydrocarbon radical having from 1 to 22 carbon atoms, said hydrocarbon radical being possibly substituted and containing from 1 to 10 functional groups selected from the group consisting of halogens, alcohols, ether, ester, ketone, aldehydes, carboxylic acids, thiols, thioethers, amine, quaternary amines and amides; possible substituents of G are halogen atoms, $NO_2$, $OR^6$, $NR^6_2$, $COOR^6$ or $R^6$ groups, $R^6$ representing a $C_1$ to $C_{15}$ alkyl or alkenyl group; and g) Q represents a hydrogen atom (in which case w=1 and n=1), or represents a group $[[P—X]_m[G]_n]$ wherein P, X, G, n and m are as defined previously (in which case w=1), or a dendrimer selected from the group consisting of the polyalkylimine dendrimers, amino acids (e.g. lysine) dendrimers, mixed amino/ether dendrimers and mixed amino/amide dendrimers, or a polysaccharide selected from the group consisting of cellulose, cyclodextrines and starches, or a cationic quaternised silicon polymer, such as the Abilquat® (origin: Goldsmith, USA), or still a polymeric backbone derived from a monomeric unit selected from the group consisting of the formulae A) to E) and mixtures thereof:

A)

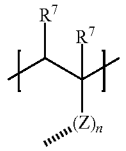

B)

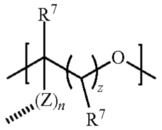

C)

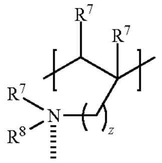

D)

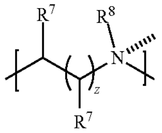

E)

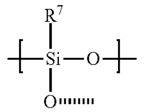

in which formulae the hatched lines indicate the location of the bond between said monomeric unit and G;

z represents an integer from 1 to 5;

n is defined as previously;

$R^7$ represents, simultaneously or independently, a hydrogen atom, a $C_1$-$C_{15}$ alkyl or alkenyl group, a $C_4$-$C_{20}$ polyalkyleneglycol group or an aromatic group;

$R^8$ represents, simultaneously or independently, a hydrogen or oxygen atom, a $C_1$-$C_5$ alkyl or glycol or does not exist; and Z represents a functional group selected from the group consisting of the formulae 1) to 8), the branching units of the formulae 9) to 11), and mixtures thereof:

1)

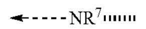

2)

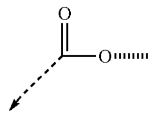

3)

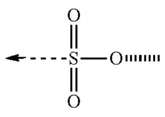

-continued

4)

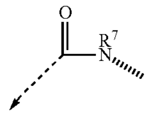

5)

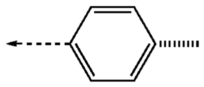

6)

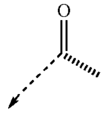

7)

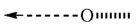

8)

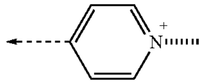

9)

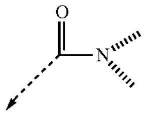

10)

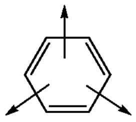

11)

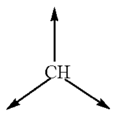

in which formulae the hatched lines are defined as previously, the dotted arrows indicate the location of the bond between said Z and the remaining part of the monomeric unit and the arrows indicate the location of the bond between said Z and either G or the remaining part of the monomeric unit, $R^7$ being as defined previously; and with the proviso that Z does not represent a group of formula 1), 3), and 7) if the monomeric unit is of formula B).

As "odoriferous α,β-unsaturated ketone, aldehyde or carboxylic ester", the expression used in the definition of P, it is understood an α,β-unsaturated ketone, aldehyde or carboxylic ester which is recognized by a skilled person as being used in perfumery as perfuming ingredient. In general, said odoriferous α,β-unsaturated ketone, aldehyde or carboxylic ester is a compound having from 8 to 20 carbon atoms, or even more preferably between 10 and 15 carbon atoms.

Preferred compounds of formula (I) are those wherein:

a) w represents an integer from 1 to 10000;

b) n represents I or 0 c) m represents 1 or 2;

d) P represents a hydrogen atom or a radical of the formulae (P-1) to (P-17), in the form of any one of its isomers:

-continued (P-1)

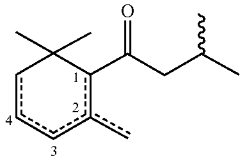

(P-2)

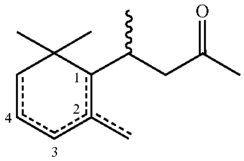

(P-3)

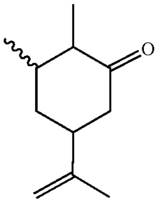

(P-4)

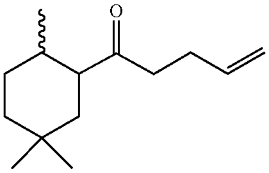

(P-5)

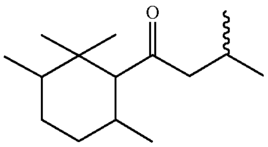

(P-6)

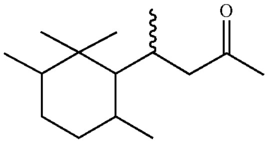

(P-7)

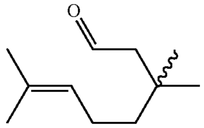

(P-8)

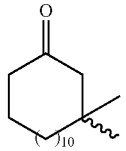

(P-9)

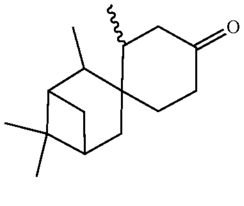

(P-10)

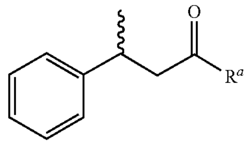

(P-11)

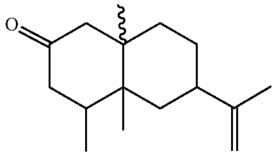

(P-12)

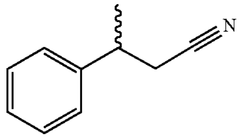

(P-13)

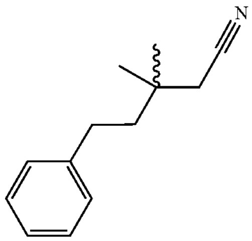

(P-14)

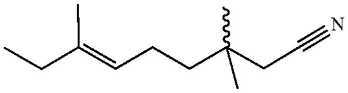

(P-15)

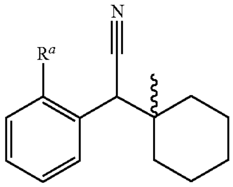

(P-16)

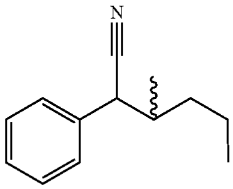

(P-17)

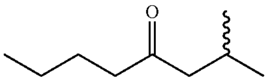

in which formulae the wavy lines have the meaning indicated above and the dotted lines represent a single or double bond, $R^a$ indicating a hydrogen atom or methyl or ethyl group; and with the proviso that at least one of the P groups is of the formulae (P-1) to (P-11) or (P-1) to (P-17) as defined hereinabove;

e) X represents a functional group selected from the group consisting of the formulae i)

ii)

iii)

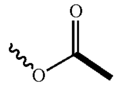

iv)

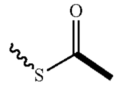

vi)

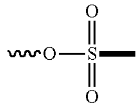

viii)

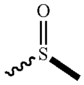

ix)

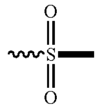

x)

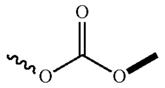

in which formulae the bold or wavy lines have the meaning indicated above; and with the proviso that X may not exist when P represents a hydrogen atom;

f) G represents a bivalent or trivalent radical derived from an aryl radical, possibly substituted, or a divalent cyclic, linear or branched alkyl, alkenyl, alkadienyl or alkylbenzene hydrocarbon radical having from 8 to 22 carbon atoms, or a trivalent cyclic, linear or branched alkyl or alkenyl hydrocarbon radical having from 1 to 22 carbon atoms, said hydrocarbon radical being possibly substituted and containing from 1 to 5 functional groups selected from the group consisting of ether, ester, ketone, amine, quaternary amines and amides; possible substituents of G are halogen atoms, $NO_2$, $OR_6$, $NR^62$, $COOR^6$ or $R^6$ groups, $R^6$ representing a $C_1$ to $C_{15}$ alkyl or alkenyl group; and g) Q represents a hydrogen atom (in which case w=1 and n=1), or represents a group $[[P—X]_m[G]_n]$ wherein P, X, G, n and m are as defined hereinabove (in which case w=1), or a polymeric backbone derived from a monomeric unit selected from the group consisting of the formulae A), C), D), E) and mixtures thereof:

A)

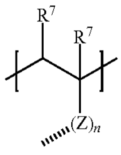

-continued

C)

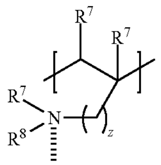

D)

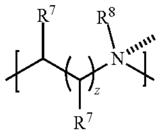

E)

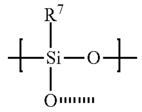

in which formulae the hatched lines, z and n are as defined previously;

$R^7$ represents, simultaneously or independently, a hydrogen atom, a $C_1$-$C_{10}$ alkyl group or a $C_4$-$C_{14}$ polyalkyleneglycol group;

$R^8$ represents, simultaneously or independently, a hydrogen or oxygen atom, a $C_1$-$C_4$ alkyl or glycol or does not exist; and Z represents a functional group selected from the groups consisting of the formulae 1) to 5), 7), the branching units of the formulae 9) and 10), and mixtures thereof:

1)

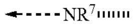

2)

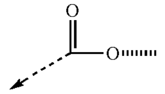

3)

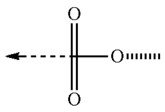

4)

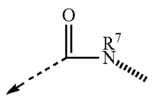

5)

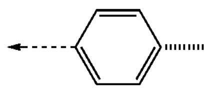

7)

9)

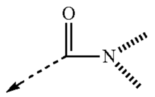

10)

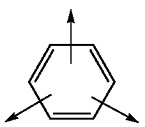

in which formulae the hatched lines, the dotted arrows and the arrows are defined as previously, $R^7$ being as defined hereinabove.

In a more preferred embodiment of the invention the compounds of formula (I) are those wherein:

a) w represents an integer from 1 to 10000;

b) n represents 1 or 0;

c) m represents 1 or 2;

d) P represents a radical of the formulae (P-1) to (P-11), as previously defined;

e) X represents a functional group selected from the group consisting of the formulae iii)

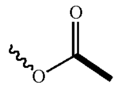

iv)

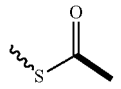

vi)

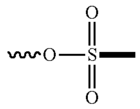

x)

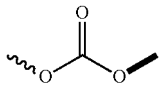

in which formulae the bold or wavy lines are defined as previously;

f) G represents a bivalent or trivalent radical derived from an aryl radical, possibly substituted, or a linear or branched alkyl, alkenyl, alkadienyl or alkylbenzene hydrocarbon radical having from 8 to 22 carbon atoms, said hydrocarbon radical being possibly substituted and containing from 1 to 5 functional groups selected from the group consisting of ether, ketone and amine; possible substituents of the G groups are halogen atoms, $NO_2$, $OR^6$, $NR^62$, $COOR^6$ or $R^6$ groups, $R^6$ representing a $C_1$ to $C_6$ alkyl or alkenyl group; and g) Q represents a hydrogen atom (in which case w=1 and n=1), or represents a group $[[P—X]_m [G]_n]$ wherein P, X, G, n and m are as defined hereinabove (in which case w=1), or a polymeric backbone derived from a monomeric unit selected from the group consisting of the formulae A), C), E) and mixtures thereof:

A)

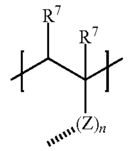

C)

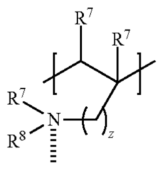

-continued

E)

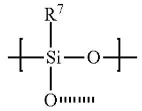

in which formulae the hatched lines, z and n are as defined previously;

$R^7$ represents, simultaneously or independently, a hydrogen atom, a $C_1$-$C_5$ alkyl group or a $C_4$-$C_{10}$ polyalkyleneglycol group;

$R^8$ represents, simultaneously or independently, a hydrogen or oxygen atom, a $C_1$-$C_4$ alkyl or glycol or does not exist; an represents a functional group selected from the groups consisting of the formulae 1) to 5), the branching units of the formulae 9) and 10), and mixtures thereof:

1)

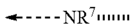

2)

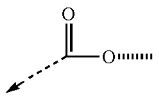

3)

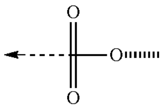

4)

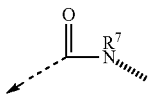

5)

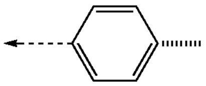

9)

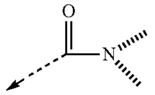

10)

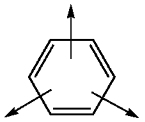

in which formulae the hatched lines, the dotted arrows and the arrows are defined as previously, $R^7$ being defined as hereinabove.

Alternatively, in said more preferred compounds of formula (I), m represents 2, X represents a functional group of formula iii), as previously defined, and G represents a trivalent linear or branched alkyl or alkenyl hydrocarbon radical having from 1 to 7 carbon atoms, said hydrocarbon radical possibly containing from 1 to 5 functional groups selected from the group consisting of ether, ketone and amine.

In another alternative of said more preferred compounds of formula (I), m represents 1 or 2, X represents a functional group selected from the group consisting of formulae ii)

viii)

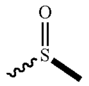

ix)

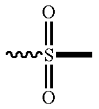

in which formulae the bold or wavy lines are defined as previously; and

G represents a bivalent radical derived from a linear or branched alkyl or alkenyl, hydrocarbon radical having from 8 to 20 carbon atoms, said hydrocarbon radical being possibly substituted and containing from 1 to 5 functional groups selected from the group consisting of ether, ketone and amine; possible substituents of the G groups are halogen atoms, $NO_2$, $OR_6$, $NR^6{}_2$, $COOR^6$ or $R^6$ groups, $R^6$ representing a $C_1$ to $C_6$ alkyl or alkenyl group.

It is understood that when m or w in formula (I) represents an integer greater than 1, then each of the various P may be identical or different, as well as each of the X or G.

An even more preferred compound of formula (I) is represented by the compound of formula (I'):

(I')

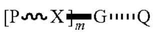

wherein m represents 1 or 2;

Q represents a hydrogen atom;

P represents a radical of the formulae (P-1) to (P-6) and (P-8), in the form of any one of their isomers:

(P-1)

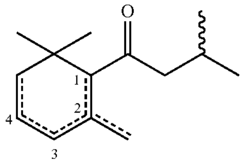

(P-2)

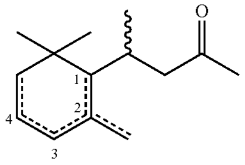

(P-3)

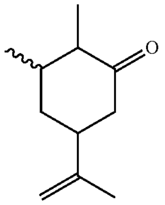

-continued (P-4)

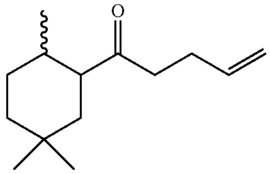

(P-5)

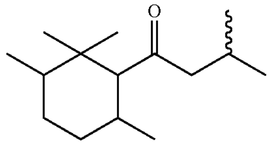

(P-6)

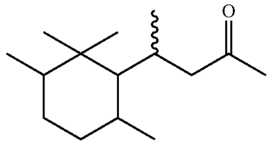

(P-8)

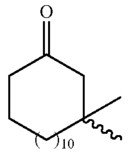

in which formulae the wavy lines and the dotted lines are as defined previously;

X represents a functional group selected from the group consisting of formulae iii)

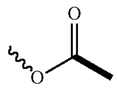

vi)

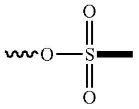

in which formulae the bold or wavy lines are defined as previously; and

G represents a bivalent or trivalent arene radical, possibly substituted by halogen atoms, $NO_2$, $OR_6$, $NR^6 2$, $COOR^6$ and $R^6$ groups, $R^6$ representing a $C_1$ to $C_6$ alkyl or alkenyl group.

Alternatively, said compounds of formula (I') are those wherein:

(I')

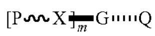

wherein P, m and Q are as defined hereinabove;

X represents a functional group of formula iii) or x), as defined above, and

G represents a bivalent radical derived from a linear or branched alkyl or alkenyl, hydrocarbon radical having from 8 to 15 carbon atoms; or G represents a trivalent radical derived from a linear or branched alkyl hydrocarbon radical having from 2 to 10 carbon atoms.

Yet, another alternative is represented by the compound of formula (I'):

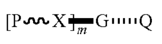

(I')

wherein P, m and Q are as defined hereinabove;

X represents a functional group selected from the group consisting of the formulae ii), viii) or ix), as defined above; and G represents a bivalent or trivalent radical derived from a linear or branched alkyl or alkenyl, hydrocarbon radical having from 8 to 15 carbon atoms.

The compound of formula (I") represents also an even more preferred embodiment of the compound of formula (I)

(I")

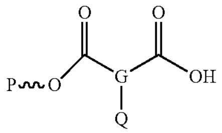

wherein Q and P have the meaning given in formula (I'); and

G represents a trivalent radical derived from a linear or branched alkyl or alkenyl, hydrocarbon radical having from 3 to 6 carbon atoms.

When m in formula (I') is equal to 2, then each of the various P may be identical or different, as well as each of the X.

The compounds of formula (I) may be synthesized from commercially available compounds by conventional methods. Generally speaking, the invention compounds are obtainable by the [1,4]-addition reaction between an odoriferous α,β-unsaturated ketone, aldehyde or carboxylic ester of formula (II')

(II')

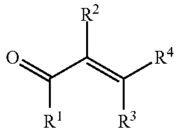

wherein the configuration of the carbon-carbon double bond can be of the E or Z type and the symbols $R^1$, $R^2$, $R^3$ and $R^4$ have the meaning indicated in formula (I); and a compound of formula $Q[(\text{-G-})_n[\text{—X—H}]_m]_w$, wherein all the symbols have the meaning given in formula (I). For practical reasons, and according to the nature and nucleophilicity of the functional group X, the compounds of formula (I) defined hereinabove may be more advantageously obtained by the reaction between the compound of formula (II"), which is the aldol derivative of the odoriferous compound of formula (II'), (II")

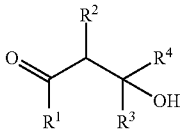

wherein the symbols $R^1$, $R^2$, $R^3$ and $R^4$ have the meaning indicated in formula (I); and a derivative of $Q[(\text{-G-})_n[\text{—X—H}]_m]_w$ such as an acid chloride, a sulfonyl chloride or an alkyl chloro formate derivative.

The use of the aldol derivative is particularly interesting for the synthesis of all the compounds of formula (I) wherein X represents, e.g., a carboxylic, sulfonate, sulfate, carbonate, phosphate, borate, and silicate functional group. On the other hand, the direct use of the odoriferous molecule as starting material is particularly interesting for the synthesis of all the compounds of formula (I) wherein X represents, e.g., an ether, thioether or yet a thiocarboxylic derivative.

Polymeric materials may also be obtained by the polymerization of one monomer to which a moiety $(\text{-G-})_n[\text{—X—P}]_m$ has been previously grafted. Said polymerisation may also be performed in the presence of other monomeric units bearing a different $(\text{-G-})_n[\text{—X—P}]_m$ moiety.

General examples of this approach are illustrated in the following scheme, for particular cases of the compounds of formula (I):

a)

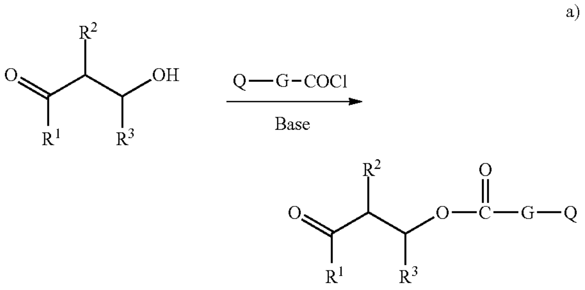

b)

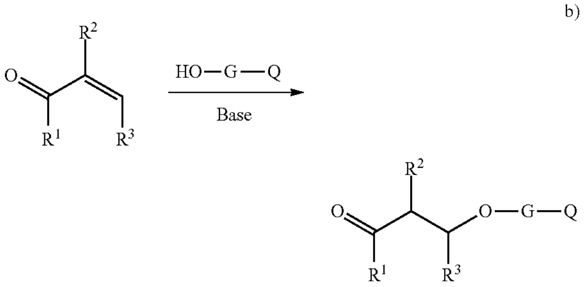

c)

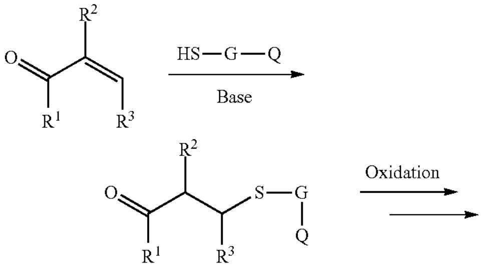

-continued

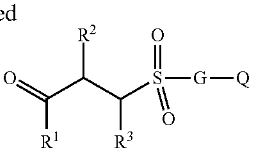

Although it is not possible to provide an exhaustive list of the compounds of formula $Q[(-G-)_n[—X—H]_m]w$ which may be used in the synthesis of the compounds of formula (I), one can cite as preferred examples the following: benzoic acid, 4- or 3-methyl-benzoic acid, 3- or 4-(N,N-dimethylamino)-benzoic acid, tosylic acid, benzenesulfonic acid, isophthalic acid, phthalic acid, terephthalic acid, benzene-1,2,3-tricarboxylic acid, ethylenediaminetetraacetic acid, nitrilotriacetic acid, alkyliminodiacetic acid (wherein alkyl represents a C1 to C10alkyl group), 10-undecenoic acid, undecanoic acid, oxalic acid, malonic acid, succinic acid, glutaric acid, adipic acid, dodecanedionic acid, 1-dodecanethiol, 1-octadecanethiol and $CH_3(CH_2)\sim S(O)_aH$ (wherein a represent 0, 1 or 2). As polymeric compounds of formula $Q[(-G-)_n[—X—H]_m]_w$ one can cite also various polymethacrylate or polystyrene based polymers or co-polymers. As derivative of the compounds of formula $Q[(-G-)_n[—X—H]_m]_w$ one can cite their alkaline salts, the acid chloride (if X═COO), the sulphonyl chloride and sulfate chloride (ifX═$SO_2$ or $SO_4$) and the chloro formate derivatives (if X═OCOO).

Similarly, it is not possible to provide an exhaustive list of the currently known odoriferous compounds of formula (II') which can be used in the synthesis of the invention compounds defined hereinabove and subsequently be released. However the following can be named as preferred examples: alpha-damascone, beta-damascone, gamma-damascone, delta-damascone, alpha-ionone, beta-ionone, gamma-ionone, delta-ionone, beta-damascenone, 3-methyl-5-propyl-2-cyclohexen-1-one, 1(6),8-P-menthadien-2-one, 2,5-dimethyl-5-phenyl-1-hexen-3-one, 1-(5,5-dimethyl-1-cyclohexen-1-yl)-4-penten-1-one, 8 or 10-methyl-alpha-ionone, 2-octenal, 1-(2,2,3,6-tetramethyl-1-cyclohexyl)-2-buten-1-one, 4-(2,2,3,6-tetramethyl-1-cyclohexyl)-3-buten-2-one, 2-cyclopentadecen-1-one, nootkatone, cinnamic aldehyde, 2,6,6-trimethyl-bicyclo[3.1.1]heptane-3-spiro-2'-cyclohexen-4'-one, ethyl 2,4-deca-dienoate, ethyl 2-octenoate, methyl 2-nonenoate, ethyl 2,4-undecadienoate and methyl 5,9-dimethyl-2,4,8-decatrienoate. Of course, the aldol derivatives of formula (II") of the latter compounds are also useful in the synthesis of the invention compounds.

Amongst the odoriferous compounds cited in the list hereinabove, the preferred are: the damascones, ionones, beta-damascenone, 1-(5,5-dimethyl-1-cyclohexen-1-yl)-4-penten-1-one, 1(6),8-P-menthadien-2-one, 2-cyclopentadecen-1-one, 1-(2,2,3,6-tetramethyl-1-cyclohexyl)-2-buten-1-one, 4-(2,2,3,6-tetramethyl-1-cyclohexyl)-3-buten-2-one and 2-cyclopentadecen-1-one.

In a particular embodiment, the pro-perfume compound is a compound selected from the group consisting of formulae a) to c)

a)

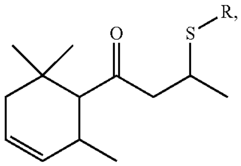

-continued b)

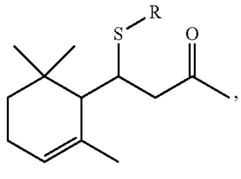

, and c)

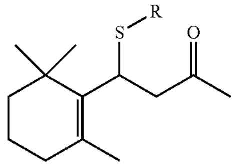

wherein R represents a $C_1$-$C_{20}$ alkyl or alkenyl group, preferably a $C_6$-$C_{16}$ alkyl or alkenyl group, more preferably a $C_{12}$ alkyl group.

The pro-perfume of formula a) releases delta-damascone as fragrance compound. Said pro-perfume may preferably be (+−)-trans-3-(dodecylthio)-1-(2,6,6-trimethyl-3-cyclohexen-1-yl)-1-butanone. Delta-damascone is also known as 1-[(1RS,2SR)-2,6,6-trimethyl-3-cyclohexen-1-yl]-2-buten-1-one.

The pro-perfume of formula b) or c) releases ionone as fragrance compound. Said pro-perfume may be present as an isomeric mixture of formula b) and formula c). The isomeric mixture may have a weight ratio of formula b) and formula c) from 40:60 to 60:40. In particular, the isomeric mixture may have a weight ratio of formula b) and formula c) of about 55:45. In particular, said pro-perfume releases two isomers of ionone as fragrance compound.

In particular, the pro-perfume of formula b) releases alpha-ionone as fragrance compound. Said pro-perfume of formula b) may preferably be (+−)-4-(dodecylthio)-4-(2,6,6-trimethyl-2-cyclohexen-1-yl)-2-butanone. Alpha-ionone is also known as (+−)-(3E)-4-(2,6,6-trimethyl-2-cyclohexen-1-yl)-3-buten-2-one.

In particular, the pro-perfume of formula c) releases beta-ionone as fragrance compound. Said pro-perfume of formula c) may preferably be (+−)-4-(dodecylthio)-4-(2,6,6-trimethyl-1-cyclohexen-1-yl)-2-butanone. Beta-ionone is also known as (3E)-4-(2,6,6-trimethyl-1-cyclohexen-1-yl)-3-buten-2-one.

In a particular embodiment, the pro-perfume compound is a linear polysiloxane co-polymer comprising at least one repeating unit of formula (III)

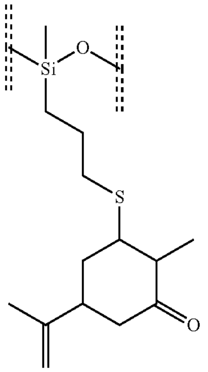

wherein the double hatched lines indicate the bonding to another repeating unit.

The pro-perfume of formula (III) releases 2-methyl-5-(prop-1-en-2-yl)cyclohex-2-en-1-one as fragrance compound, which is also known as carvone.

In a particular embodiment, the pro-perfume compound is selected from the group consisting of 3-(dodecylthio)-1-(2,6,6-trimethylcyclohex-3-en-1-yl)butan-1-one (Haloscent® D), 2-(dodecylthio)-4-octanone, 3-(dodecylthio)-1-(2,6,6-trimethylcyclohex-2-en-1-yl)butan-1-one, 4-(dodecylthio)-4-(2,6,6-trimethylcyclohex-2-en-1-yl)butan-2-one (Haloscent® I), and 4-(dodecylthio)-4-(2,6,6-trimethylcyclohex-1-en-1-yl)butan-2-one (Haloscent® I), or any mixtures thereof.

In another preferred embodiment, the pro-perfume is a compound according to formula (IV)

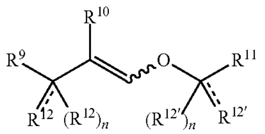

wherein, $R^9$ represents a $C_{1-15}$ alkyl, $C_{2-15}$ alkenyl, $C_{3-15}$ cycloalkyl or $C_{5-15}$ cycloalkenyl group, each optionally substituted with one or more of a $C_{1-15}$ alkyl, $C_{1-15}$ alkoxy, $C_{3-15}$ cycloalkyl, $C_{5-15}$ cycloalkenyl, $C_{6-10}$ aryl and/or $C_{6-10}$ aryloxy group, each optionally substituted with one or more of a $C_{1-8}$ alkyl, $C_{1-8}$ alkoxy, hydroxy, carboxylic acid and/or $C_{1-4}$ carboxylic ester group;

$R^{10}$ represents a hydrogen atom, a $C_{1-15}$ alkyl group or a $C_{1-6}$ alkoxy group;

$R^9$ and $R^{10}$, when taken together, form a $C_{5-15}$ cycloalkyl, $C_{5-15}$ cycloalkenyl, $C_{4-14}$ heterocycloalkyl or $C_{4-14}$ heterocycloalkenyl group, each optionally substituted with one or more of a $C_{1-15}$ alkyl, $C_{1-15}$ alkoxy, $C_{3-15}$ cycloalkyl, $C_{5-15}$ cycloalkenyl, $C_{6-10}$ aryl group, each optionally substituted with one or more of a $C_{1-8}$ alkyl, $C_{1-8}$ alkoxy, carboxylic acid and/or $C_{1-4}$ carboxylic ester group, wherein the heteroatom represents one or more of an oxygen;

$R^{11}$ represents a hydrogen, a $C_{1-15}$ alkyl, $C_{2-15}$ alkenyl, $C_{3-15}$ cycloalkyl, $C_{5-15}$ cycloalkenyl or $C_{6-10}$ aryloxy group, each optionally substituted with one or more a $C_{1-15}$ alkyl, $C_{1-15}$ alkoxy, $C_{3-15}$ cycloalkyl, $C_{5-15}$ cycloalkenyl, $C_{6-10}$ aryl and/or $C_{6-10}$ aryloxy group, each optionally substituted with one or more of a $C_{1-8}$ alkyl, $C_{1-8}$ alkoxy, carboxylic acid and/or $C_{1-4}$ carboxylic ester group; and $R^{12}$ and $R^{12'}$, each independently, represent a hydrogen or a $C_{1-5}$ alkyl group; and $R^{11}$ and $R^{12}$, when taken together, form a $C_{3-15}$ cycloalkyl, $C_{5-15}$ cycloalkenyl group or $C_{6-10}$ aryl group, each optionally substituted with one or more of a $C_{1-15}$ alkyl, $C_{2-10}$ alkenyl, $C_{1-15}$ alkoxy, $C_{3-15}$ cycloalkyl, $C_{5-15}$ cycloalkenyl, $C_{6-10}$ aryl and/or $C_{6-10}$ aryloxy group, each optionally substituted with one or more of a $C_{1-8}$ alkyl, $C_{1-8}$ alkoxy, carboxylic acid and/or $C_1$0.4 carboxylic ester group;

$R^9$ and $R^{12}$, when taken together, form a $C_{3-15}$ cycloalkyl, $C_{5-15}$ cycloalkenyl or $C_{6-10}$ aryl group, each optionally substituted with one or more of a $C_{1-15}$ alkyl, $C_{2-10}$ alkenyl, $C_{1-15}$ alkoxy, $C_{3-15}$ cycloalkyl, $C_{5-15}$ cycloalkenyl, $C_{6-10}$ aryl and/or $C_{6-10}$ aryloxy group, each optionally substituted with one or more of a $C_{1-8}$ alkyl, $C_{1-8}$ alkoxy, carboxylic acid and/or $C_{1-4}$ carboxylic ester group;

the dotted line represent a single bond when n is 1 or the dotted line represent a double bond when n is 0 provided that the dotted line is a double bond when $R^9$ and $R^{12}$ and/or $R^{11}$ and $R^{12'}$ are taken together to form $C_{6-10}$ aryl.

For the sake of clarity, in case $R^{11}$ and $R^{12}$, when taken together form a $C_{6-10}$ aryl group, one $R^{12'}$ given in the formula above is to be omitted.

For the sake of clarity, in case $R^9$ and $R^{12}$, when taken together form a $C_{6-10}$ aryl group, one $R^{12}$ given in the formula above is to be omitted.

The term "optionally" is understood that a certain group to be optionally substituted can or cannot be substituted with a certain functional group. The term "one or more" is understood as being substituted with 1 to 7, preferably 1 to 5, and more preferably 1 to 3 of a certain functional group. The terms "alkyl" and "alkenyl" are understood as comprising branched and linear alkyl and alkenyl groups. The terms "alkenyl", "cycloalkenyl" and "heterocycloalkenyl" is understood as comprising 1, 2 or 3 olefinic double bonds, preferably 1 or 2 olefinic double bonds. The terms "cycloalkyl", "cycloalkenyl", "heterocycloalkyl" and "heterocycloalkenyl" are understood as comprising a monocyclic or fused, spiro and/or bridged bicyclic or tricyclic cycloalkyl, cycloalkenyl, heterocycloalkyl and heterocycloalkenyl groups, preferably monocyclic cycloalkyl, cycloalkenyl, heterocycloalkyl and heterocycloalkenyl groups.

The term "aryl" are understood as comprising any group comprising at least one aromatic group such as phenyl, indenyl, indanyl, tetrahydronaphthalenyl or naphthalenyl group.

In a particular embodiment, in case, "$R^9$ and $R^{12}$, when taken together" and/or "$R^{11}$ and $R^{12'}$, when taken together" form a cycloalkenyl group, it is understood that the olefinic double bond is not adjacent to the carbon connecting $R^9$ and $R^{12}$ or $R^{11}$ and $R^{12}$, respectively. Preferably, in case an alkenyl group is substituted with an alkoxy group, the alkoxy group cannot be adjacent to the olefinic double bond of the alkenyl group to form an enol ether.

For the sake of clarity, in case $R^9$ and $R^{12}$ or $R^{11}$ and $R^{12}$, when taken together form a $C_{6-10}$ aryl, one $R^{12}$ given in the formula above is to be omitted.

In a particular embodiment, $R^9$ represents a $C_{1-10}$ alkyl, $C_{2-10}$ alkenyl, $C_{311}$ cycloalkyl or $C_{511}$ cycloalkenyl group, each optionally substituted with one or more of a $C_{1-4}$ alkyl, $C_1$0.4 alkoxy, $C_{3-8}$ cycloalkyl, $C_{5-8}$ cycloalkenyl, $C_6$ aryl and/or $C_6$ aryloxy group, each optionally substituted with one or more of a $C_{1-4}$ alkyl or a $C_{1-4}$ alkoxy, carboxylic acid and/or $C_{1-4}$ carboxylic ester group.

In a particular embodiment, $R^9$ represents a $C_{1-10}$ alkyl, $C_{2-10}$ alkenyl or $C_3$-$C_{11}$ cycloalkyl group, each optionally substituted with one or more of a $C_{1-4}$ alkyl, $C_{1-4}$ alkoxy, $C_{3-8}$ cycloalkyl, $C_{5-8}$ cycloalkenyl, $C_6$ aryl and/or $C_6$ aryloxy group, each optionally substituted with one or more of a $C_{1-4}$ alkyl or a $C_{1-4}$ alkoxy group.

In a particular embodiment, $R^9$ represents a $C_{1-10}$ alkyl group, optionally substituted with a $C_{5-7}$ cycloalkyl, $C_{5-7}$ cycloalkenyl and/or $C_6$ aryl group, each optionally substituted with one or more of a $C_{1-4}$ alkyl and/or $C_{1-4}$ alkoxy group. Preferably, $R^9$ represents a $C_{1-10}$ alkyl group, optionally substituted with a $C_{5-7}$ cycloalkyl, $C_{5-7}$ cycloalkenyl and/or $C_6$ aryl group, each optionally substituted with one or more of methyl and/or methoxy group.

In a particular embodiment, $R^{10}$ represents a hydrogen atom, a $C_{1-10}$ alkyl group. Preferably, $R^{10}$ represents a hydrogen atom, a $C_{1-5}$ alkyl or a $C_{1-3}$ alkyl group, more preferably a methyl group.

In a particular embodiment, $R^9$ and $R^{10}$, when taken together, form a $C_{511}$ cycloalkyl, $C_{511}$ cycloalkenyl, $C_{411}$ heterocycloalkyl, or $C_{411}$ heterocycloalkenyl group, each optionally substituted with one or more of a $C_{1-5}$ alkyl, $C_{1-5}$ alkoxy, $C_{3-8}$ cycloalkyl, $C_{5-8}$ cycloalkenyl or $C_6$ aryl group, each optionally substituted with one or more of a $C_{1-5}$ alkyl, $C_{1-5}$ alkoxy, carboxylic acid and/or $C_{1-4}$ carboxylic ester group, wherein the heteroatom represents one or more of an oxygen.

In a particular embodiment, $R^9$ and $R^{10}$, when taken together, form a $C_5$0.7 cycloalkyl, $C_{5-7}$ cycloalkenyl, $C_{5-7}$ heterocycloalkyl, or $C_{5-8}$ heterocycloalkenyl group, each optionally substituted with one or more of a $C_{1-4}$ alkyl, $C_{1-4}$ alkoxy, $C_{5-7}$ cycloalkyl, $C_{5-7}$ cycloalkenyl or $C_6$ aryl group, each optionally substituted with one or more of a $C_{1-3}$ alkyl, $C_1$0.3 alkoxy, carboxylic acid and/or $C_{1-3}$ carboxylic ester group, wherein the heteroatom represents one or more of an oxygen.

In a particular embodiment, $R^9$ and $R^{10}$, when taken together, form a $C_{5-7}$ cycloalkyl or $C_{5-7}$ cycloalkenyl group, each optionally substituted with one or more of a $C_1$0.4 alkyl or $C_{1-4}$ alkoxy group.

In a particular embodiment, $R^{12}$ and $R^{12'}$, each independently, represents a hydrogen or a $C_{1-5}$ alkyl group. Preferably, $R^{12}$ and $R^{12'}$, each independently, represents a hydrogen or a $C_{1-3}$ alkyl group. Preferably, $R^{12}$ and $R^{12'}$, each independently, represents hydrogen and only one $R^{12}$ or $R^{12'}$ represents a $C_{1-3}$ alkyl group. Preferably, $R^{12}$ and $R^{12'}$, each independently represents hydrogen and only one $R^{12}$ or $R^{12'}$ represents a $C_{1-2}$ alkyl group. Preferably, $R^{12}$ and $R^{12'}$ represents hydrogen.

In a particular embodiment, $R^9$ and $R^{12}$, being adjacent to $R^9$, when taken together, form a $C_{3-11}$ cycloalkyl, $C_{5-11}$ cycloalkenyl or $C_{6-10}$ aryl group, each optionally substituted with one or more of a $C_{1-5}$ alkyl, $C_{1-5}$ alkoxy, $C_{3-7}$ cycloalkyl, $C_{5-7}$ cycloalkenyl and/or $C_6$ aryl group, each optionally substituted with one or more of a $C_{1-4}$ alkyl or $C_{1-4}$ alkoxy group.

In a particular embodiment, $R^9$ and $R^{12}$, when taken together, form a $C_{311}$ cycloalkyl, $C_{511}$ cycloalkenyl or $C_{6-10}$ aryl group, each optionally substituted with one or more of a $C_1$0.3 alkyl or $C_{1-3}$ alkoxy group.

In a particular embodiment, $R^9$ and $R^{12}$, when taken together, form a $C_3$-n cycloalkyl or $C_{6-10}$ aryl group, optionally substituted with one or more of a $C_{1-3}$ alkyl or $C_{1-3}$ alkoxy group.

In a particular embodiment, $R^{11}$ represents a $C_{1-10}$ alkyl, $C_{2-10}$ alkenyl, $C_{3-15}$ cycloalkyl or $C_{511}$ cycloalkenyl group, each optionally substituted with one or more of a $C_{1-5}$ alkyl, $C_{1-5}$ alkoxy, $C_{3-8}$ cycloalkyl, $C_{5-8}$ cycloalkenyl, $C_6$ aryl and/or $C_6$ aryloxy group, each optionally substituted with one or more of a $C_{1-5}$ alkyl or $C_{1-5}$ alkoxy group.

In a particular embodiment, $R^{11}$ represents a $C_{1-10}$ alkyl, $C_{3-10}$ alkenyl, $C_{4-15}$ cycloalkyl or $C_{511}$ cycloalkenyl group, each optionally substituted with one or more of a $C_{1-4}$ alkyl, $C_1$0.4 alkoxy, $C_{5-6}$ cycloalkyl, $C_{5-6}$ cycloalkenyl $C_6$ aryl and/or $C_6$ aryloxy group, each optionally substituted with one or more of a $C_{1-3}$ alkyl or $C_{1-3}$ alkoxy group.

In a particular embodiment, $R^{11}$ represents a $C_{1-10}$ alkyl, $C_{3-10}$ alkenyl or $C_{5-15}$ cycloalkyl group, each optionally substituted with one or more of a $C_{1-4}$ alkyl, $C_6$ aryl and/or $C_6$ aryloxy group.

In a particular embodiment, $R^{11}$ and $R^{12'}$, being adjacent to $R^{11}$, when taken together, form a $C_{3-12}$ cycloalkyl, $C_{5-11}$ cycloalkenyl or $C_{6-10}$ aryl group, each optionally substituted with one or more of a $C_{1-5}$ alkyl, $C_{1-5}$ alkoxy, $C_{3-7}$ cycloalkyl, $C_{5-7}$ cycloalkenyl and/or $C_6$ aryl group, each optionally substituted with one or more of a $C_{1-4}$ alkyl or $C_{1-4}$ alkoxy group.

In a particular embodiment, $R^{11}$ and $R^{12}$, when taken together, form a $C_{3-12}$ cycloalkyl, $C_{511}$ cycloalkenyl group or $C_{6-10}$ aryl group, each optionally substituted with one or more of a $C_1$0.3 alkyl or $C_{1-3}$ alkoxy group.

In a particular embodiment, $R^{11}$ and $R^{12'}$, when taken together, form a $C_{3-12}$ cycloalkyl group or $C_{6-10}$ aryl group, optionally substituted with one or more of a $C_{1-3}$ alkyl or $C_{1-3}$ alkoxy group.

In a particular embodiment, the pro-perfume compound of formula (IV) is selected from the group consisting of (2-((2-methylundec-1-en-1-yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl)oxy)-2-methylundec-1-ene, (2-((2-methylundec-1-en-1-yl)oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene and 4-allyl-2-methoxy-1-((2-methoxy-2-phenylvinyl)oxy)benzene.

In another preferred embodiment, the pro-perfume is a compound of formula (V)

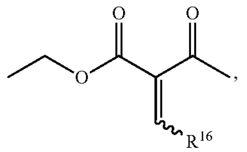

wherein $R^{16}$ is the residue of an aldehyde of formula $R^{16}CHO$ having a molecular weight comprised between 80 and 230 g/mol and having a perfuming effect.

In a particular embodiment, the pro-perfume compound of formula (V) is characterized in that $R^{16}$ is the residue of an aldehyde $R^{16}CHO$ wherein $R^{16}$ is a linear or branched $C_{4-22}$ alkyl or alkenyl, preferably a linear or branched $C_{6-16}$ alkyl or alkenyl.

In a particular embodiment, the pro-perfume compound of formula (V) is characterized in that the residue of an aldehyde $R^{16}CHO$ is 2-methylundecanal.

In another preferred embodiment, the pro-perfume may be selected from the group consisting of 3-(4-tert-butyl-1-cyclohexen-1-yl)propyl 2-oxo-2-phenylacetate, 3-(4-tert-butylphenyl)-2-methylpropyl 2-cyclohexyl-2-oxoacetate, 3-(4-(tert-butyl)phenyl)-2-methylpropyl 2-oxo-2-phenylacetate, decyl 2-cyclohexyl-2-oxoacetate, decyl 2-oxo-2-phenylacetate, (2,4-dimethyl-3-cyclohexen-1-yl)methyl 2-cyclohexyl-2-oxoacetate, (2,4-dimethyl-3-cyclohexen-1-yl) methyl 2-oxo-2-phenylacetate, 1-(3,3- and 5,5-dimethyl-1-cyclohexen-1-yl)-4-pentenyl 2-oxo-2-phenylacetate, 3-(3,3- and 1,1-dimethyl-2,3-dihydro-1H-inden-5-yl)propyl 2-oxo-2-phenylacetate, 2,6-dimethyl-5-heptenyl 2-oxo-2-phenylacetate, 3,7-dimethyl-2,6-octadienyl 2-cyclohexyl-2-oxoacetate, 3,7-dimethyl-2,6-octadienyl 2-(4-methylcyclohexyl)-2-oxoacetate, 3,7-dimethyl-2,6-octadienyl 3-methyl-2-oxopentanoate, 3,7-dimethyl-2,6-octadienyl 2-oxo-2-phenylacetate, 3,7-dimethyl-2,6-octadienyl 2-oxopropanoate, 3,7-dimethyl-6-octenyl 2-(4-acetylphenyl)-2-oxoacetate, 3,7-dimethyl-6-octenyl (bicyclo[2.2.1]hept-2exo-yl)oxoacetate, 3,7-dimethyl-6-octenyl 2-cyclohexyl-2-oxoacetate, 3,7-dimethyl-6-octenyl 2-cyclopentyl-2-oxoacetate, 3,7-dimethyl-6-octenyl 2-(4-methylcyclohexyl)-2-oxoacetate, 3,7-dimethyl-6-octenyl [4-(2-methyl-1,3-dioxolan-2-yl)phenyl]oxoacetate, 3,7-dimethyl-6-octenyl 3-methyl-2-oxopentadecanoate, 3,7-dimethyl-6-octenyl 3-methyl-2-oxopentanoate, 3,7-dimethyl-6-octenyl 2-oxobutanoate, 3,7-dimethyl-6-octenyl 2-oxohexadecanoate, 3,7-dimethyl-6-octenyl 2-oxopentanoate, 3,7-dimethyl-6-octenyl 2-oxo-2-phenylacetate, 3,7-dimethyl-6-octenyl 2-oxopropanoate, 4-(1,1-dimethylpropyl)-1-cyclohexyl 2-cyclohexyl-2-oxoacetate, 4-dodecenyl 2-oxo-2-phenylacetate, 3,5,5,6,7,8,8-heptamethyl-5,6,7,8-tetrahydronaphthalen-2-yl)methyl 2-oxo-2-phenylacetate, 1-(3,5,5,6,8,8-hexamethyl-5,6,7,8-tetrahydro-2-naphthalenyl)ethyl 2-oxo-2-phenylacetate, 3-hexenyl 2-oxo-2-phenylacetate, 3-hexenyl 2-oxopropanoate, 7-hydroxy-3,7-dimethyloctyl 2-oxo2-phenylacetate, [4- and 3-(4-hydroxy-4-methylpentyl)-3-cyclohexen-1-yl]methyl 2-oxo-2-phenylacetate, 2-isopropyl-5-methylcyclohexyl 2-cyclohexyl-2-oxoacetate, 2-isopropyl-5-methylcyclohexyl 2-oxo-2-phenylacetate, 4-methoxybenzyl 2-cyclohexyl-2-oxoacetate, [4- and 3-(4-methyl-3-pentenyl)-3-cyclohexen-1-yl]methyl 2-oxo-2-phenylacetate, 3-methyl-5-phenylpentyl 2-oxo-2-phenylacetate, 2-methyl-4-(2',2',3'-trimethyl-3'-cyclopenten-1'-yl)-4-pentenyl 2-oxo-2-phenylacetate, 2,6-nonadienyl 2-oxo-2-phenylacetate, 3-nonenyl 2-oxo-2-phenylacetate, 2-pentyl-1-cyclopentyl 2-cyclohexyl-2-oxoacetate, 4-phenylbutan-2-yl 2-oxo-2-phenylacetate, 2-phenylethyl 2-oxo-2-phenylacetate, 2-phenylethyl 2-oxopropanoate, 3,5,6,6-tetramethyl-4-methyleneheptan-2-yl 2-oxo-2-phenylacetate, 4-(2,6,6-trimethyl-2-cyclohexenyl)-3-buten-2-yl 2-oxo-2-phenylacetate, 9-undecenyl 2-oxo-2-phenylacetate or 10-undecenyl 2-oxo-2-phenylacetate. Particularly, the pro-perfume may be 2-phenylethyl 2-oxo-2-phenylacetate, 3-hexen-1-yl oxo(phenyl)acetate or 2,6-dimethyl-5-heptenyl oxo(phenyl)acetate.

According to the present invention, the fragrance delivery system comprises a carrier material.

By carrier material it is understood that the material has to be suitable to hold i.e. to disperse in or absorb within, a certain amount of perfume oil. In order to be qualified as a carrier material the carrier material has to hold i.e. to disperse in or absorbed within, at least 20 weight %, preferably at least 30 weight %, even more preferably at least 35 weight % of the perfume oil, based on the total weight of the carrier material. Moreover, by holding it is understood that the carrier material does not allow more than 10%, preferably not more than 7%, even more preferably not more than 5% and most preferably substantially no leakage of the perfume oil under ambient conditions.

In an embodiment of the present invention, the carrier material comprises a monomeric, oligomeric or polymeric carrier material, or mixtures of two or more of these. An oligomeric carrier is a carrier wherein 2-10 monomeric units are linked by covalent bonds. For example, if the oligomeric carrier is a carbohydrate, the oligomeric carrier may be sucrose, lactose, raffinose, maltose, trehalose, fructo-oligosaccharides.

Examples of a monomeric carrier materials are glucose, fructose, mannose, galactose, arabinose, fucose, sorbitol, mannitol, for example.

Polymeric carriers have more than 10 monomeric units that are linked by covalent bonds.

In a preferred embodiment, the carrier may be a polymeric carrier material. Non-limiting examples of polymeric carrier material includes polyvinyl acetates, polyvinyl alcohol, dextrines, maltodextrines, glucose syrups, natural or modified starch, polysaccharides, carbohydrates, chitosan, gum Arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, vegetable gums, gum acacia, pectins, xanthanes, alginates, carragenans or cellulose derivatives, such as carboxymethyl methylcellulose, methylcellulose or hydroxyethyl cellulose, and mixture thereof. Preferably the polymeric carrier material comprises natural or modified starch, maltodextrins or carbohydrates.

In a preferred embodiment, the carrier material is a solid carrier material.

The carrier material is preferably present in an amount between 25 and 80 weight %, preferably between 30 and 60 weight % and more preferably between 40 and 55 weight % based on the total weight of the fragrance delivery system.

In a preferred embodiment, the polymeric carrier material may further comprise a fireproofing agent, preferably selected from the group consisting of sodium silicate, potassium silicate, sodium carbonate, sodium hydrogencarbonate, monoammonium phosphate or carbonate, diammonium phosphate, mono-, di- or trisodium phosphate, sodium hypophosphite, melamine cyanurate, chlorinated hydrocarbons, talc and mixtures thereof.

In a preferred embodiment, the perfume oil comprises 0.1 to 100 weight %, preferably 0.5 to 50 weight %, even more preferably 1.0 to 25 weight % and most preferably 1.5 to 20 weight % of the pro-perfume compound, based on the total weight of the perfume oil.

In a preferred embodiment, the fragrance delivery system comprises 20 to 70 weight %, preferably 30 to 60 weight % and even more preferably 35 to 55 weight % of the perfume oil, based on the total weight of the fragrance delivery system.

In a preferred embodiment, the fragrance delivery system comprises 0.02 to 50 weight %, preferably 0.1 to 35 weight %, even more preferably 0.2 to 20 weight % and most preferably 0.3 to 15 weight % of the pro-perfume compound, based on the total weight of the fragrance delivery system.

The fragrance delivery system can be prepared by any standard method for preparing particles known by a skilled person and as for example described by the non-limiting Examples.

The fragrance delivery system can be prepared by forming an emulsion comprising the perfume oil and the carrier material and drying the emulsion.

Drying can be conducted by spray-drying, for example using a Buchi spray-drier (origin: Switzerland).

Moreover, the present invention relates to a perfuming composition comprising a fragrance delivery system, as defined hereinabove;

at least one ingredient selected from the group consisting of a perfumery carrier, a perfuming co-ingredient or a mixture thereof; and optionally, a perfumery adjuvant.

By "perfumery carrier" it is herein understood a material which is practically neutral from a perfumery point of view, i.e. that does not significantly alter the organoleptic properties of perfuming ingredients. Said carrier may be a liquid or a solid, preferably a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting example solvents such as dipropyleneglycol, diethyl phthalate, isopropyl myristate, Abalyn, benzyl benzoate, 2-(2-ethoxyethoxy)-1-ethanol or triethyl citrate, which are the most commonly used or also naturally derived solvents like glycerol or various vegetable oils such as palm oil, sunflower oil or linseed oil. For the compositions which comprise both a perfumery carrier and a perfumery base, other suitable perfumery carriers, than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company).

As solid carrier one may cite, as non-limiting examples, inorganic salts, absorbing gums or polymers. Examples of such materials may comprise wall-forming and plasticizing materials, such as, natural or modified starches, hydrocolloids, cellulose derivatives, polyvinyl acetates, polyvinylalcohols, proteins, pectins, urea, sodium chloride, sodium sulphate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides such as sucrose, mono-, di-, and polysaccharides and derivatives such as starch, cellulose, methyl cellulose, ethyl cellulose, propyl cellulose, polyols/sugar alcohols such as sorbitol, maltitol, xylitol, erythritol, and isomalt, polyethylene glycol (PEG), polyvinyl pyrrolidin (PVP), citric acid or any water soluble solid acid, fatty alcohols or fatty acids and mixtures thereof, or yet the materials cited in reference texts such as H. Scherz, Hydrokolloids: Stabilisatoren, Dickungs- und Gehermittel in Lebensmittel, Band 2 der Schriftenreihe Lebensmittelchemie, Lebensmittelqualitat, Behr's VerlagGmbH & Co., Hamburg, 1996.

The solid carrier is particles having preferably a median volume-weighted size comprised between 10 and 20000 μm, preferably between 40 and 10000 μm, more preferably between 50 and 6000 μm.

By "perfuming co-ingredient", it is meant an ingredient equivalent to what has been defined above as perfume ingredient. Said ingredient can take the form of a liquid oil, but can also be present in the form of a delivery system such as a pro-perfume, microcapsules, emulsions, dispersions or powders.

An invention's composition consisting of a fragrance delivery system as herein defined and at least one perfumery carrier represents a particular embodiment of the invention as well as a perfuming composition comprising a fragrance delivery system, at least one perfumery carrier, at least one perfuming co-ingredient, and optionally at least one perfumery adjuvant.

It is noteworthy to mention herein that the possibility to have, in the compositions mentioned above, more than one fragrance delivery system is important as it enables the perfumer to prepare accords, perfumes, possessing the odor tonality of various compounds of the invention, creating thus new tools for his work.

In a preferred embodiment, the composition comprises 0.001 to 30 weight %, preferably 0.01 to 20 weight %, more preferably 0.1 to 10 weight % and even more preferably 0.15 to 5 weight % of the fragrance delivery system, based on the total weight of the composition.

Moreover, the present invention relates to a perfumed consumer product comprising a fragrance delivery system as defined hereinabove or a composition as defined hereinabove.

For the sake of clarity, it has to be mentioned that, the term "perfumed consumer product" is understood as a consumer product which is expected to deliver at least a pleasant perfuming effect to the surface to which it is applied (e.g. skin, hair, textile, or hard surface). In other words, a perfumed consumer product according to the invention is a perfumed consumer product which comprises the functional formulation, as well as optionally additional benefit agents, corresponding to the desired consumer product, e.g. a conditioner, a detergent or an air freshener, and an olfactively effective amount of at least one invention's compound. For the sake of clarity, the perfumed consumer product is a non-edible product.

The nature and type of the constituents of the perfumed consumer product do not warrant a more detailed description here, which in any case would not be exhaustive, the skilled person being able to select them on the basis of his general knowledge and according to the nature and the desired effect of the product.

In a preferred embodiment, the perfumed consumer product is a dry perfumed consumer product. Thereby it is understood that the perfumed consumer product does not contain more than 20 weight %, more preferably not more than 10 weight %, even more preferably not more than 5 weight % and most preferably substantially no moisture. A perfume oil according to the present invention does not qualify as moisture.

In a preferred embodiment, the perfumed consumer product is in form of granules or powder.

In a preferred embodiment, the perfumed consumer product is selected from the group consisting of a fine perfume, a splash or eau de perfume, a cologne, an shave or after-shave lotion, a liquid or solid detergent, a fabric softener, a fabric refresher, an ironing water, a paper, a bleach, a carpet cleaners, curtain-care products a shampoo, a coloring preparation, a color care product, a hair shaping product, a hair conditioning product, a dental care product, a disinfectant, an intimate care product, a hair spray, a vanishing cream, a deodorant or antiperspirant, hair remover, tanning or sun product, nail products, skin cleansing, a makeup, a perfumed soap, shower or bath mousse, oil or gel, or a foot/hand care products, a hygiene product, an air freshener, a "ready to use" powdered air freshener, a mold remover, furniture care, wipe, a dish detergent or hard-surface detergent, a leather care product, a car care product.

In a more preferred embodiment, the perfumed consumer product is selected from the group of solid detergent, solid cleaning additive such as bleach booster formulations, scouring powder, each with or without oxidizing agent such as bleach, solid fabric softener, solid fabric boosters, tablet dishwasher, solid skin, hair or hand cleanser, dry shampoo and solid or low water antiperspirant and deodorants, more preferably a machine wash powder detergent, and washed powder detergent, bleach booster formulations, scouring powder, each with or without oxidizing agent, such as bleach, bleach booster formulations, solid fabric softener and solid scent boosters.

In a preferred embodiment, the perfumed consumer product comprises 0.001 to 30 weight %, preferably 0.01 to 20 weight %, more preferably 0.1 to 10 weight %, most preferably 0.15 to 5 weight % of the fragrance delivery system, based on the total weight of the perfumed product.

The perfumed consumer product may further comprise further perfumery adjuvant. By "perfumery adjuvant" it is meant here an ingredient capable of imparting additional added benefit such as a color, a particular light resistance, chemical stability, etc. A detailed description of the nature and type of adjuvant commonly used in perfumed consumer product cannot be exhaustive, but it has to be mentioned that said ingredients are well known to a person skilled in the art. One may cite as specific non-limiting examples the following: bleach activators, surfactants, builders, chelating agents, dye transfer, inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, anti-agglomeration agents, coatings, formaldehyde scavengers and/or pigments, and combinations thereof.

The concentration of the adjuvant(s) added in the perfumed consumer product and its precise nature will depend, as the person skilled in the art knows, on the nature of the adjuvant, the nature the perfumed consumer product, and the nature of the operation for which it is to be used and the physical form of the perfumed consumer product and. The perfumed consumer product may comprise at least one adjuvant. Detailed on adjuvants are provided herein-below.

The perfumed consumer product according to the present invention may comprise surfactants which may be of the zwitterionic, anionic, ampholytic, nonionic, or cationic type or may comprise compatible mixtures of these types. In perfumed consumer product in the form of a laundry detergent, anionic and nonionic surfactants are typically used. In addition to the anionic surfactant, the perfumed consumer products may further contain a nonionic surfactant. The perfumed consumer product may comprise from 0.01% to about 30%, particularly from about 0.01% to about 20%, more particularly from about 0.1% to about 10%, by weight of the perfumed consumer product, of a nonionic surfactant. In some embodiments, the nonionic surfactant may comprise an ethoxylated nonionic surfactant.

Particular embodiments of ethoxylated nonionic surfactants are the ethoxylated alcohols and ethoxylated alkyl phenols of the formula $R(OC_2H_4)_nOH$, wherein R is selected from the group consisting of aliphatic hydrocarbon radicals containing from about 8 to about 20 carbon atoms and alkyl phenyl radicals in which the alkyl groups contain from about 8 to about 12 carbon atoms, and the average value of n is from about 5 to about 15.

Particular embodiments of nonionic surfactants have the formula $R^1(OC_2H_4)_nOH$, wherein $R^1$ is a $C_{10}$-$C_{16}$ alkyl group or a $C_8$-$C_{12}$ alkyl phenyl group, and n is from 3 to about 80. In a particular embodiment, non-ionic surfactants are condensation products of $C_9$-$C_{15}$ alcohols with from about 5 to about 20 moles of ethylene oxide per mole of alcohol.

The perfumed consumer product according to the present invention may comprise a cationic surfactant in amounts of up to about 30%, particularly from about 0.01% to about 20%, more particularly from about 0.1% to about 20%, by weight of the perfumed consumer product. It is herein understood that cationic surfactants include those which can deliver fabric care benefits. Non-limiting examples may include fatty amines; quaternary ammonium surfactants; and imidazoline quat materials. Non-limiting examples of fabric softening actives can be N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxyethyl)N-methyl ammonium methylsulfate; 1, 2 di(stearoyl-oxy) 3 trimethyl ammonium-propane chloride; the reaction product of N-(2-hydroxy-ethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid; dialkylenedimethylammonium salts such as dicanoladimethylammonium chloride, di(hard)tallowdimethylammonium chloride dicanoladimethy!ammonium methylsulfate; 1-methyl-1-stearoylamidoethy 1-2-stearoylimidazolinium methylsulfate; 1-tallowylamidoethyl-2-tallowylimidazoline; N,N"-dialkyldiethylenetriamine; polyglycerol esters (PGEs), oily sugar derivatives, and wax emulsions and a mixture of the aforementioned.

The perfumed consumer product according to the present invention may comprise dispersants in an amount of from about 0.1%, to about 10%, by weight of the perfumed consumer product. Particular water-soluble organic materials are the homo- or co-polymeric acids or their salts, in which the polycarboxylic acid may contain at least two carboxyl radicals separated from each other by not more than two carbon atoms. In a particular embodiment, dispersants may also be alkoxylated derivatives of polyamines, and/or quaternized derivatives.

The perfumed consumer product according to the present invention may also comprise a builder in an amount of from about 0.1% to 80% by weight of the perfumed consumer product. Perfumed consumer products in granular form may contain from about 1% to 50% by weight of the perfumed consumer product of the builder component. A detailed description of the nature and type of builders commonly used in perfumed consumer product cannot be exhaustive, but it has to be mentioned that said ingredient is well known to a person skilled in the art. In particular embodiments, the builder may comprise phosphate salts as well as various organic and inorganic non-phosphorus builders. In particular embodiments, water-soluble, non-phosphorus organic builders may include the various alkali metal, ammonium and substituted ammonium polyacetates, carboxylates, polycarboxylates and polyhydroxy sulfonates. In a particular embodiment, polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. In a further particular embodiment, polycarboxylate builders are the oxydisuccinates and the ether carboxylate builder compositions comprising a combination of tartrate monosuccinate and tartrate disuccinate.

The perfumed consumer product according to the present invention may comprise one or more detergent enzymes. Detergent enzymes provide cleaning performance and/or fabric care benefits. A detailed description of the nature and type of detergent enzymes commonly used in perfumed consumer product cannot be exhaustive, but it has to be mentioned that said ingredient is well known to a person skilled in the art. Suitable detergent enzymes include hemicellulases, peroxidases, proteases, cellulases, xylnases, lipases, phospholipases, esterases, cutinases, pctinases, keratanases, reductases, oxidases, phenoloxdases, lipoxygenases, ligninases, pullulanases, tannases, pentosanases, malanases, B-glucanases, arabinosidases, hyaluronidase, chondroitinase, laccase, and amylases, or mixtures thereof. In a particular embodiment, a combination may be a combination of conventional applicable enzymes like protease, lipase, cutinase and/or cellulase in conjunction with amylase. Enzymes can be used at the amounts as used as taught by suppliers or in the art, such as at levels recommended by suppliers such as Novozymes and Genencor. Typical amounts of detergent enzymes in the perfumed consumer product are from about 0.0001% to about 5% by weight of the perfumed consumer product. In a particular embodiment, the detergent enzymes can be used at very low levels, e.g., from about 0.001% or lower; or they can be used in heavy-duty laundry detergent formulations at higher levels, e.g., about 0.1% and higher.

The perfumed consumer product according to the present invention may also comprise a brightener. The brightener may include any compound that exhibits fluorescence, including compounds that absorb UV light and reemit as "blue" visible light. A detailed description of the nature and type of brighteners commonly used in perfumed consumer product cannot be exhaustive, but it has to be mentioned that said ingredient is well known to a person skilled in the art. One may cite as non-limiting examples of useful brighteners: derivatives of stilbene or 4,4'-diaminostilbene, biphenyl, five-membered heterocycles such as triazoles, pyrazolines, oxazoles, imidiazoles, etc., or six membered heterocycles (coumarins, naphthalamide, s-triazine, etc.). In an embodiment, cationic, anionic, nonionic, amphoteric and zwitterionic brighteners can be used. Suitable brighteners may include those commercially distributed under the trade name Tinopal-UNPA-GX® by Ciba Specialty Chemical Corporation (High Point, NC).

The perfumed consumer product according to the present invention may comprise a bleach system. Bleach systems suitable for use herein contain one or more bleaching agents. A detailed description of the nature and type of bleach system commonly used in perfumed consumer product cannot be exhaustive, but it has to be mentioned that said ingredient is well known to a person skilled in the art. One may cite as non-limiting examples of bleaching systems or bleaching agents catalytic metal complexes; activated peroxygen sources; bleach activators; bleach boosters; photobleaches; bleaching enzymes; free radical initiators; $H_2O_2$; hypohalite bleaches; peroxygen sources, including perborate and/or percarbonate and combinations thereof. Suitable bleach activators include perhydrolyzable esters and perhydrolyzable imides such as, tetraacetyl ethylene diamine, octanoylcaprolactam, benzoyloxybenzenesulphonate, nonanoyloxybenzene-sulphonate benzoylvalerolactam, dodecanoyloxybenzenesulphonate.

Other bleaching agents include metal complexes of transitional metals with ligands of defined stability constants.

The perfumed consumer product according to the present invention may also comprise one or more dye transfer inhibiting agents in an amount of from about 0.0001%, from about 0.01%, from about 0.05% by weight of the perfumed consumer product to about 10%, about 2%, or even about 1% by weight of the perfumed consumer product. A detailed description of the nature and type of a dye transfer inhibiting agent commonly used in perfumed consumer product cannot be exhaustive, but it has to be mentioned that said ingredient is well known to a person skilled in the art. One may cite as suitable dye transfer inhibiting agent of such as polyvinylpyrrolidone polymers, polyamine N-oxide polymers, copolymers of N-vinylpyrrolidone and N-vinylimidazole, polyvinyloxazolidones and polyvinylimidazoles or mixtures thereof.

The perfumed consumer product of the present invention may comprise a chelant in an amount of less than about 5%, or from about 0.01% to about 3%, by weight of the perfumed consumer product. A detailed description of the nature and type of a dchelant commonly used in perfumed consumer product cannot be exhaustive, but it has to be mentioned that said ingredient is well known to a person skilled in the art. One may cite as suitable chelant citrates; nitrogen-containing, P-free aminocarboxylates such as EDDS, EDTA and DTPA; aminophosphonates such as diethylenetriamine pentamethylenephosphonic acid and, ethylenediamine tetramethylenephosphonic acid; nitrogen-free phosphonates e.g., HEDP; and nitrogen or oxygen containing, P-free carboxylate-free chelants such as compounds of the general class of certain macrocyclic N-ligands such as those defined above with regard to bleach catalyst systems.

The perfumed consumer product according to the present invention may also comprise anti-agglomeration agent materials. A detailed description of the nature and type of a anti-agglomeration agent materials commonly used in perfumed consumer product cannot be exhaustive, but it has to be mentioned that said ingredient is well known to a person skilled in the art. One may cite as anti-agglomeration agent materials divalent salts such as magnesium salts, for example, magnesium chloride, magnesium acetate, magnesium phosphate, magnesium formate, magnesium boride, magnesium titanate, magnesium sulfate heptahydrate; calcium salts, for example, calcium chloride, calcium formate, calcium acetate, calcium bromide; trivalent salts, such as aluminum salts, for example, aluminum sulfate, aluminum phosphate, aluminum chloride hydrate and polymers that have the ability to suspend anionic particles such as suspension polymers. Particular examples thereof are polyethylene imines, alkoxylated polyethylene imines, polyquaternium-6 and polyquaternium-7.

The perfumed consumer product of the present invention may also comprise silicones. Silicones comprise Si—O moieties and may be selected from (a) non functionalized siloxane polymers, (b) functionalized siloxane polymers, and combination thereof. A detailed description of the nature and type of silicons commonly used in perfumed consumer product cannot be exhaustive, but it has to be mentioned that said ingredient is well known to a person skilled in the art. The molecular weight of the organosilicone can be indicated by the reference to the viscosity. In one embodiment, the organosilicones may comprise a viscosity of from about 10 to about 2,000,000 centistokes at 25° C. In a particular embodiment, the organosilicones may have a viscosity of from about 10 to about 800,000 centistokes at 25° C.

In a particular embodiment, organosilicones may be linear, branched or cross-linked or may comprise a cyclic silicone. In a particular embodiment, the cyclic silicone may comprise a cyclomethicone of the formula $[(CH_3)_2SiO]_n$ where n is an integer that may range from about 3 to about 7, or from about 5 to about 6.

In particular embodiments, the organosilicone may comprise a functionalized siloxane polymer. Functionalized siloxane polymers may comprise one or more functional moieties selected from the group consisting of amino, amido, alkoxy, hydroxy, polyether, sulfate phosphate carboxy, hydride, mercapto, and/or quaternary ammonium moieties. These one or more functional moieties may be attached directly to the siloxane backbone through a bivalent alkylene radical, (i.e., "pendant") or may be part of the siloxane backbone. In a particular embodiment, functionalized siloxane polymers may include materials selected from the group consisting of aminosilicones, amidosilicones, silicone polyethers, silicone-urethane polymers, quaternary (AB)n silicones, amino (AB)n silicones, and combinations thereof.

In particular embodiments, the functionalized siloxane polymer may comprise a silicone polyether which may be also known as dimethicone copolyol. Silicone polyethers may comprise a polydimethylsiloxane backbone with one or more polyoxyalkylene chains. The polyoxyalkylene moieties may be incorporated in the polymer as terminal blocks or as pendent chains. In particular embodiments, the functionalized siloxane polymer may comprise an aminosilicone.

In particular embodiments, the organosilicone may comprise amine (AB)n silicones and quaternary (AB)n silicones. It is known that such organosilicones can be produced by reacting a diamine with an epoxide.

In particular embodiments, the functionalized siloxane polymer may comprise silicone-urethanes. such silicone-urethanes are commercially available from Wacker Silicones under the trade name SLM-21200®.

The perfumed consumer product according to the present invention may also comprise structurant materials. A detailed description of the nature and type of a structurant material commonly used in perfumed consumer product cannot be exhaustive, but it has to be mentioned that said ingredient is well known to a person skilled in the art. Structurant materials in the context of the present invention may be added to adequately suspend the benefit agent containing delivery particles include polysaccharides. One may cite as non-limiting examples gellan gum, waxy maize or dent corn starch, octenyl succinated starches, derivatized starches such as hydroxyethylated or hydroxypropylated starches, carrageenan, guar gum, pectin, xanthan gum and mixtures thereof; modified celluloses such as hydrolyzed cellulose acetate, hydroxy propyl cellulose, methyl cellulose, and mixtures thereof; modified proteins such as gelatin; hydrogenated and non-hydrogenated polyalkenes, and mixtures thereof; inorganic salts, for example, magnesium chloride, calcium chloride, calcium formate, magnesium formate, aluminum chloride, potassium permanganate, laponite clay, bentonite clay and mixtures thereof; polysaccharides in combination with inorganic salts; quaternized polymeric materials, for example, polyether amines, alkyl trimethyl ammonium chlorides, diester ditallow ammonium chloride; imidazoles; nonionic polymers with a pKa less than 6.0, for example polyethyleneimine, polyethyleneimine ethoxylate; polyurethanes. Suppliers of such materials are CP Kelco Corp. of San Diego, California, USA; Degussa A G or Dusseldorf, Germany; BASF AG of Ludwigshafen, Germany; Rhodia Corp. of Cranbury, New Jersey, USA; Baker Hughes Corp. of Houston, Texas, USA; Hercules Corp. of Wilmington, Delaware, USA; Agrium Inc. of Calgary, Alberta, Canada, ISP of New Jersey, U.S.A and can be obtained therefrom.

The perfumed consumer product of the present invention may also comprise a fabric hueing agent A detailed description of the nature and type of a hueing agent commonly used in perfumed consumer product cannot be exhaustive, but it has to be mentioned that said ingredient is well known to a person skilled in the art. For the sake of clarity, a hueing agent may be also referred to as for example shading, bluing or whitening agents). In a particular embodiment, the hueing agent provides a blue or violet shade to fabrics. In the context of the present invention it is understood that hueing agents can be used either alone or in combination to create a specific shade of hueing and/or to shade different fabric types. In a particular embodiment, this may be provided by mixing a red and green-blue dye to yield a blue or violet shade. One may select as hueing agents any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene,styryl, triarylmethane, triphenylmethane, xanthenes and mixtures thereof.

In a particular embodiment, fabric hueing agents include dyes, dye-clay conjugates, and organic and inorganic pigments. In a particular embodiment, dyes include small molecule dyes and polymeric dyes. In a particular embodiment, small molecule dyes include small molecule dyes selected from the group consisting of dyes falling into the Colour Index (C.I.) classifications of Acid, Direct, Basic, Reactive or hydrolysed Reactive, Solvent or Disperse dyes for example that are classified as Blue, Violet, Red, Green or Black, and provide the desired shade either alone or in combination. In a particular embodiment, small molecule dyes may comprise small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, AciD Black dyes such as 1, Basic Violet dyes such as 1, 3, 4,10 and 35, Basic Blue dyes such as 3, 16, 22, 47, 66, 75 and 159, Disperse or Solvent dyes U.S. Pat. No. 8,268,016 B2, or dyes as disclosed in U.S. Pat. No. 7,208,459 B2, and mixtures thereof. In a particular embodiment, small molecule dyes may comprise small molecule dyes selected from the group consisting of C. I. numbers Acid Violet 17, Acid Blue 80, Acid Violet 50, Direct Blue 71, Direct Violet 51, Direct Blue 1, Acid Red 88, Acid Red 150, Acid Blue 29, Acid Blue 113 or mixtures thereof.

In a particular embodiment, polymeric dyes include polymeric dyes selected from the group consisting of polymers containing covalently bound (sometimes referred to as conjugated) chromogens, (dye polymer conjugates), such as polymers with chromogens co-polymerized into the backbone of the polymer and mixtures thereof. Polymeric dyes may comprise those dyes described in U.S. Pat. No. 7,686,892 B2.

In some particular embodiments, polymeric dyes may comprise polymeric dyes selected from the group consisting of fabric-substantive colorants such as the one sold under the name of Liquitint® (Milliken, Spartanburg, South Carolina, USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In some particular embodiments, polymeric dyes may comprise polymeric dyes selected from the group consisting of Liquitint® Violet C T, carboxymethyl cellulose (CMC) covalently bound to a reactive blue, reactive violet or reactive red dye such as CMC conjugated with C.I. Reactive Blue 19, such as the one sold by Megazyme, Wicklow, Ireland under the product name AZO-CM-CELLULOSE, product code S-ACMC, alkoxylated triphenylmethane polymeric colourants, alkoxylated thiophene polymeric colourants, and mixtures thereof.

In a particular embodiment, dye clay conjugates include dye clay conjugates selected from the group including at least a smectite clay and one cationic/basic dye, and mixtures thereof. In a particular embodiment, dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, C.I. Basic Black 1 through 11, and a clay selected from the group consisting of Montmorillonite clay, Hectorite clay, Saponite clay and mixtures thereof. In one particular embodiment, dye clay conjugates may comprise dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G I C.I. 42040 conjugate, Montmorillonite Basic Red R I C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G I C.I. 42040 conjugate, Hectorite Basic Red R I C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G I C.I. 42040 conjugate, Saponite Basic Red R I C.I. 45160 conjugate, Saponite C.I. Basic Black 2 conjugate and mixtures thereof. In the context of the present invention it is understood that the hueing agent may be incorporated into the perfumed consumer product as part of a reaction mixture which is the result of the organic synthesis for a dye molecule and including optional purification step(s). It is understood that such reaction mixtures comprise the dye molecule itself and in addition may comprise un-reacted starting materials and/or by-products of the organic synthesis route.

In a particular embodiment, pigments may comprise pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by Cr—$C_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof. In a particular embodiment, pigments may comprise pigments selected from the group consisting of Ultramarine Blue (C.I. Pigment Blue 29), Ultramarine Violet (C.I. Pigment Violet 15), Monastral Blue and mixtures thereof.

In the context of the present invention it is understood that the above mentioned hueing agents can be used in combination and in particular any mixture of hueing agents as above mentioned can be used.

EXAMPLES

The present invention will be described in further detail by way of the following non-limiting examples.

Example 1: Preparation of Encapsulated Perfume a Comprising a Pro-Perfume and Powder Detergents Comprising the Same a. Exemplary perfume (Perfume A)

Perfume A relates to the following composition in Table 1:

TABLE 1

Composition of perfume A

| Chemical name | Amount (% wt) |
|---|---|
| Ethyl-2-methylbutyrate | 7% |
| Hexyl acetate | 1% |
| Methyl-2-ethylhexanoate | 2% |
| Dihydromyrcenol | 9% |
| 2,4-Dimethyl-3-cyclohexene-1-carbaldehyde | 3% |
| 3,7-Dimethyl-3-octanol | 24% |
| 3-Phenylbutanal | 1% |
| Citronellyl nitrile | 1% |
| Diphenyloxyde | 5% |
| Verdyl acetate | 12% |
| Verdyl propionate | 13% |
| Tricyclo[5.2.1.0(2,6)]dec-3-en-8-yl isobutyrate | 3% |
| Diethyl 1,4-cyclohexane dicarboxylate | 3% |
| Methyl dihydrojasmonate | 2% |
| 3-(Dodecylthio)-1-(2,6,6-trimethyl-3-cyclohexen-1-yl)-1-butanone (pro-perfume compound) | 15% |

b. Exemplary Fragrance Delivery Systems

An emulsion of the following composition was spray-dried in a Büchi spray-drier (origin: Switzerland) to obtain spray-dried starch matrix granules having the following compositions:

TABLE 1

Composition of the spray-dried granules A & B

| Ingredients | Starch matrix granules A | Starch matrix granules B |
|---|---|---|
| Perfume A | 46 | 48.5 |
| Modified starch | 26 | 27.5 |
| Maltose Syrup | 21.5 | |
| Maltodextrine 18 DE | | 8.5 |
| Sucrose | | 8.5 |
| Tripotassium Citrate | 4 | 4.3 |
| Citric acid | 2 | 2.2 |
| Silica | 0.5 | 0.5 |
| Total | 100% | 100% |

c. Exemplary Bleach and Bleach-Free Powder Detergents 100 g of both bleach and bleach free powder detergent was perfumed with 0.24% of Perfume A. This mixture was then hand-mixed for 5 min to ensure a homogeneous sample.

The equivalent neat oil was delivered in another sample with dosed at 0.52 or 0.50% in the powder detergent (46% or 48.5% oil loading in starch matrix granules).

The samples were stored in cardboard box under hot & humid condition (40° C./80 RH)

| Ingredients | Effective Amount of Ingredient (% wt)a) |
|---|---|
| Bleach or bleach free powder detergent formulation | 99.76% |
| Perfume A | 0.24% |
| Bleach or bleach free powder detergent formulation | 99.48% |
| Starch matrix granules A containing 46% of Perfume A | 0.52% (i.e. 0.24% encapsulated Perfume A) |
| Bleach or bleach free powder detergent formulation | 99.50% |
| Starch matrix granules B containing 48.5% of Perfume A | 0.50% (i.e. 0.24% encapsulated Perfume A) |

Example 2: Storage Stability of Pro-Perfume Compound in a Powder Detergent a. Test Protocol The stability of the pro-perfume compound 3-(dodecylthio)-1-(2,6,6-trimethyl-3-cyclohexen-1-yl)-1-butanone was studied in a powder detergent with and without bleach when it is delivered via the free oil or through a starch encapsulation.

Perfume A concentration in the powder detergent base was equivalent to 0.24%.

The chassis of the model powder detergent bases comprised sodium sulfate, sodium carbonate, sodium dodecylbenzensulfonate, sodium silicate, zeolite, $C_{12-15}$ pareth-7, bentonite, citric acid, Sodium Acrylic Acid/MA Copolymer, sodium carbonate peroxide, tetrasodium etidronate, sodium chloride, sodium bicarbonate, cellulose gum, Disodium Anilinomorpholinotriazinylaminostilbenesulfonate, Phenylpropyl Dimethicone, enzyme, dye. The base with bleach contained the same as above plus the following additional ingredients: perborate & TAED The model powder detergent bases used have the following typical range:

| Ingredient | % for bleach formulation |
|---|---|
| Anionic surfactant | 5-25% |
| Non ionic surfactant | 2-15% |
| Builder: | 20-50% |
| Percarborate | 5-20% |
| TAED | 1-8% |
| Polymer | 3-10% |
| Optical brightener | 0.1-0.5% |
| Enzyme, Dye | <2% |

The loss of 3-(dodecylthio)-1-(2,6,6-trimethyl-3-cyclohexen-1-yl)-1-butanone was measured over time at both 22° C. & 40° C. by GC/MS.

b. Test Results

The test results are summarized in Table 3 and 4 below.

TABLE 3

3-(dodecylthio)-1-(2,6,6-trimethyl-3-cyclohexen-1-yl)-1-butanone loss (%) over storage in a bleach formulation

| 3-(dodecylthio)-1-(2,6,6-trimethyl-3-cyclohexen-1-yl)-1- | 22° C. | | | 40° C. | | |
|---|---|---|---|---|---|---|
| butanone loss | 2 weeks | 4 weeks | 8 weeks | 2 weeks | 4 weeks | 8 weeks |
| In Perfume A as a free oil | 2% | 14% | 22% | 43% | 94% | 100% |
| In starch matrix granules A | 0% | 4.5% | 8% | 6% | 30% | 39% |
| In starch matrix granules B | 0% | 5% | 9% | 5% | 31% | 41% |

TABLE 4

3-(dodecylthio)-1-(2,6,6-trimethyl-3-cyclohexen-1-yl)-1-butanone loss (%) over storage in a bleach-free formulation

| 3-(dodecylthio)-1-(2,6,6- | 22° C. | | | 40° C | | |
|---|---|---|---|---|---|---|
| trimethyl-3-cyclohexen-1-yl)-1-butanone loss | 2 weeks | 4 weeks | 8 weeks | 2 weeks | 4 weeks | 8 weeks |
| In Perfume A as a free oil | 1% | 21% | 25% | 39% | 88% | 100% |
| In starch matrix granules A | 0% | 4.9% | 10.5% | 3.5% | 30.5% | 38% |
| In starch matrix granules B | 0% | 4.5% | 10% | 4% | 29% | 37% |

c. Conclusion

Tables 3 and 4 show that the pro-perfume compound 3-(dodecylthio)-1-(2,6,6-trimethyl-3-cyclohexen-1-yl)-1-butanone loss upon storage in any powder detergent, bleach-free or not, is significantly higher when it is used in the free oil especially under stressed storage conditions at 40° C. where it reached almost a full degradation in 4 weeks no matter if the base contains bleach or not.

Stability of the pro-perfume compound 3-(dodecylthio)-1-(2,6,6-trimethyl-3-cyclohexen-1-yl)-1-butanone is significantly improved when incorporated in a starch matrix according to the present invention.

Loss of the pro-perfume compound 3-(dodecylthio)-1-(2,6,6-trimethyl-3-cyclohexen-1-yl)-1-butanone in powder detergent from perfume A encapsulated in starch matrix is far less pronounced compared to perfume A added to the detergent as free oil.

Example 3: Olfactive performance of 3-(dodecylthio)-1-(2,6,6-trimethyl-3-cyclohexen-1-yl)-1-butanone in Bleach-Free Powder Detergent a. Composition

Bleach-free powder formulation composed of sodium sulfate, sodium carbonate, sodium dodecylbenzensulfonate, sodium silicate, zeolite, $C_{12-15}$ pareth-7, bentonite, citric acid, Sodium Acrylic Acid/MA Copolymer, sodium carbonate peroxide, tetrasodium etidronate, sodium chloride, sodium bicarbonate, cellulose gum, Disodium Anilinomorpholinotriazinylaminostilbenesulfonate, Phenylpropyl Dimethicone, enzyme, dye.

The model powder detergent bases used have the following typical range:

| Ingredient | % for bleach-free formulation |
|---|---|
| Anionic surfactant | 5-20% |
| Non ionic surfactant | 3-12% |
| Builder | 20-65% |
| Polymer | 3-10% |
| Optical brightener | 0.1-0.5% |
| Enzyme, Dye | <1% |

b. Test Protocol

Fabrics were hand-washed using 15 g of powder detergent from the 4 weeks aged samples from above example in 3 liters of water. After the wash, fabrics were line-dried overnight before the odor intensity of the cotton towels was evaluated by an expert panel of 5 trained panelists. The panelists were asked to rate the odor intensity of the towels on a scale from 1 to 7, 1 corresponding to odorless and 7 corresponding to a very strong odor.

c. Test Results

The results are shown in Table 5 below.

TABLE 5

Olfactive performance in bleach free powder detergent when stored at 22° C.

| Overall Perfume Intensity | Line Drying | | | |
|---|---|---|---|---|
| Samples stored 4 weeks @ 22° C. | 1 day | 3 days | 5 days | 7 days |
| Powder Detergent + 0.24% Perfume A | 3.25 | 4.25 | 3.75 | 3.75 |
| Powder Detergent + 0.52% starch matrix granules A containing 46% of Perfume A (i.e. 0.24% encapsulated Perfume A) | 3.5 | 4.5 | 4 | 4 |
| Powder Detergent + 0.50% starch matrix granules B containing 48.5% of Perfume A (i.e. 0.24% encapsulated Perfume A) | 3.75 | 4.5 | 4.25 | 4 |

TABLE 6

Olfactive performance in bleach free powder detergent when stored at 40° C.

| Overall Perfume Intensity | Line Drying | | | |
|---|---|---|---|---|
| Samples stored 4 weeks @ 40° C. | 1 day | 3 days | 5 days | 7 days |
| Powder Detergent + 0.24% Perfume A | 1.5 | 1.5 | 1.5 | 1.5 |
| Powder Detergent + 0.52% starch matrix granules A containing 46% of Perfume A (i.e. 0.24% encapsulated Perfume A) | 3 | 4.25 | 3.75 | 3.5 |
| Powder Detergent + 0.50% starch matrix granules B containing 48% of Perfume A (i.e. 0.24% encapsulated Perfume A) | 3 | 4 | 3.5 | 3.5 |

d. Conclusions

While after 4 weeks storage at 22° C., performance on dry fabrics due to the presence of pro-perfume compound 3-(dodecylthio)-1-(2,6,6-trimethyl-3-cyclohexen-1-yl)-1-butanone is just slightly weaker when the perfume was added directly to the powder detergent as free oil rather than encapsulated, the difference is striking after storage at high storage temperature.

After 4 weeks storage of the detergent at 40° C., performance on dry fabrics from perfume A added as free oil is much lower than if perfume A had been encapsulated in a starch matrix.

Performance on dry fabrics from perfume A added as free oil is significantly lower after 4 weeks storage of the detergent at 40° C. versus 22° C. whereas if perfume A had been encapsulated in a starch matrix, the drop in performance between 22° C. and 40° C. is very low.

Example 4: Preparation of Encapsulated Perfumes B to F Comprising a Pro-Perfume and Powder Detergents Comprising the Same a. Exemplary Perfumes (Perfumes B to F)

Perfumes B to F relate to the following compositions in Table 6:

TABLE 6

Composition of perfumes B to F

| Chemical name | Amount (% wt) |
|---|---|
| 1-pentyl-2-propenyl acetate | 0.31% |
| 1,5-dimethyl-1-vinyl-4-hexenyl acetate | 24.56% |
| (+)-(1R,2R,4S)-1,3,3-trimethylbicyclo[2.2.1]heptan-2-ol | 0.15% |
| (1S,2S/2R,4S)-1,7,7-trimethylbicyclo[2.2.1]heptan-2-ol | 1.93% |

TABLE 6-continued

| Composition of perfumes B to F | |
|---|---|
| Chemical name | Amount (% wt) |
| 2,2-dimethyl-3-methylene-bicyclo[2.2.1]heptane | 0.39% |
| 1,7,7-trimethylbicyclo[2.2.1]heptan-2-one | 5.39% |
| 1-octen-3-ol | 0.39% |
| 2,6-dimethyl-7-octen-2-ol | 15.40% |
| 3,7-dimethyl-1-octanol | 0.01% |
| 4-(2-methyl-2-propanyl)cyclohexyl acetate | 1.54% |
| 5-methyl-3-heptanone | 0.01% |
| 1,3,3-trimethyl-2-oxabicyclo[2.2.2]octane | 11.55% |
| 3,4,5,6,6-pentamethylhept-3-en-2-one | 0.01% |
| 3,7-dimethyl-1,6-octadien-3-ol | 9.24% |
| 2,6-dimethyl-5-heptenal | 0.04% |
| 6-methyl-5-hepten-2-one | 0.39% |
| 2-octanone | 1.16% |
| 7-methyl-3-methylene-1,6-octadiene | 0.39% |
| (2,2-dimethyl-3-[3-methyl-2,4-pentadien-1-yl]oxirane | 0.77% |
| 2-(tetrahydro-5-methyl-5-vinyl-2-furyl)-2-propanol | 0.77% |
| 1-isopropyl-4-methylbenzene S | 0.23% |
| (2E,6Z)-2,6-nonadienal | 0.00% |
| Apha/beta-pinene | 0.77% |
| (Z)-3-hexen-1-ol | 0.01% |
| 1-methyl-4-(2-propanyl)-1,4-cyclohexadiene | 0.08% |
| Alpha-terpineol | 1.54% |
| pro-perfume compound[1)] | 20% |
| Triethanolamine | 3% |

[1)]In perfume B, the pro-perfume compound was 4-(dodecylthio)-4-(2,6,6-trimethyl-1/2-cyclohexen-1-yl)-2-butanone;
in perfume C, the pro-perfume compound was 2-methyl-1-undecen-1-yl 2-phenylethyl ether; and
in perfume D, the pro-perfume compound was (E/Z)-2-acetyl-4-methyltridec-2-enoate.
In perfume E, the pro-perfume compound was 3-(Dodecylthio)-1-(2,6,6-trimethyl-3-cyclohexen-1-yl)-1-butanone;
in perfume F, the pro-perfume compound was 1-methoxy-4-[3-methyl-4-(2-phenylethoxy)-3-buten-1-yl)benzene.

b. Exemplary Fragrance Delivery Systems and Exemplary Bleach and Bleach-Free Powder Detergents The exemplary fragrance delivery systems and exemplary bleach and bleach-free powder detergents of Example 4 are prepared according to Example 1 hereinabove.

Example 5: Storage stability of 4-(dodecylthio)-4-(2,6,6-trimethyl-1/2-cyclohexen-1-yl)-2-butanone in a powder detergent The loss in perfume B of the pro-perfume compound being a mixture comprising 4-(dodecylthio)-4-(2,6,6-trimethyl-1-cyclohexen-1-yl)-2-butanone and 4-(dodecylthio)-4-(2,6,6-trimethyl-2-cyclohexen-1-yl)-2-butanone was measured over time at both 22° C. and 37° C. by GC/MS.

a. Test Results

The test results are summarized in Table 7 herein below.

TABLE 7

| Pro-perfume Loss (%) over storage | | |
|---|---|---|
| 4-(dodecylthio)-4-(2,6,6-trimethyl- | 37° C. | |
| 1/2-cyclohexen-1-yl)-2-butanone Loss | 2 weeks | 4 weeks |
| In Perfume B as a free oil | 97% | 96% |
| In Perfume B encapsulated in a starch matrix | 0% | 32% |

b. Conclusion 4-(dodecylthio)-4-(2,6,6-trimethyl-1/2-cyclohexen-1-yl)-2-butanone loss upon storage in a powder detergent is almost complete, already after 2 weeks, when it is used in the free oil under stressed storage conditions at 40° C. The stability of 4-(dodecylthio)-4-(2,6,6-trimethyl-1/2-cyclohexen-1-yl)-2-butanone is very much improved when protected in a starch matrix. Loss of 4-(dodecylthio)-4-(2,6,6-trimethyl-1/2-cyclohexen-1-yl)-2-butanone in powder detergent from perfume B encapsulated in starch matrix is far less pronounced compared to perfume B added to the detergent as free oil. After 2 weeks storage there is virtually no loss and after 2 additional weeks the loss noticed is only 32%.

Example 6: Olfactive performance of 4-(dodecylthio)-4-(2,6,6-trimethyl-1/2-cyclohexen-1-yl)-2-butanone in powder detergent a. Composition

A model bleach powder composition contains amongst other ingredients: 15-30% Oxygen Based Bleaching Agents, 5-15% Anionic Surfactants, Zeolites, less than 5% Non-Ionic Surfactants, Phosphonates, Polycarboxylates, Optical Brightener.

b. Protocol

Fabrics (2.0 kg of cotton terry towels) were washed at 37° C. in a standard European horizontal axis machine (Miele Novotronic W 900-79 CH) using samples put on storage for 2 weeks at 37° C. After the wash, fabrics were line-dried overnight before the odor intensity of the cotton towels was evaluated by a panel of 20 trained panelists. The panelists were asked to rate the odor intensity of the towels on a scale from 1 to 7, 1 corresponding to odorless and 7 corresponding to a very strong odor.

c. Test Results

The results are shown in Table 8 hereinbelow.

TABLE 8

| Olfactive performance of 4-(dodecylthio)-4-(2,6,6-trimethyl-1/2-cyclohexen-1-yl)-2-butanone according to the invention | | | |
|---|---|---|---|
| Overall Perfume Intensity | Line Drying | | |
| Samples stored 2 weeks @ 37° C. | 1 day | 3 days | 7 days |
| Powder Detergent + 0.24% Perfume B | 2.15 | 2.12 | 2.28 |
| Powder Detergent + 0.52% starch matrix granules A containing 46% of Perfume B (i.e. 0.24% encapsulated perfume B) | 3 | 2.99 | 3.03 |

d. Conclusions

After 2 weeks storage of the detergent at 37° C., perfume intensity on dry fabrics from perfume B encapsulated in a starch matrix is much higher than if perfume B had been added as free oil. Perfume signal is more complex and more powerful as the pro-perfume has not been destroyed upon storage Example 7: Olfactive performance of 2-methyl-1-undecen-1-yl 2-phenylethyl ether in powder detergent a. Composition and Test protocol The composition and Test protocol of Example 7 is according to Example 5 hereinabove.

b. Test results

The results are shown in Table 9 hereinbelow

TABLE 9

| Olfactive performance of 2-methyl-1-undecen-1-yl 2-phenylethyl ether according to the invention | | | |
|---|---|---|---|
| Overall Perfume Intensity | Line Drying | | |
| Samples stored 2 weeks @ 37° C. | 1 day | 3 days | 7 days |
| Powder Detergent + 0.24% Perfume C | 2 | 2.2 | 2.1 |
| Powder Detergent + 0.52% starch matrix granules A containing 46% of perfume C (i.e. 0.24% encapsulated Perfume C) | 2.3 | 2.6 | 2.55 |

c. Conclusions

Perfume Intensity on dry fabrics appears to be higher when perfume C is protected into the starch matrix.

Example 8: Olfactive performance of ethyl (E/Z)-2-acetyl-4-methyltridec-2-enoate in powder detergent a. Composition and Test Protocol The composition and Test protocol of Example 8 is according to Example 5 hereinabove.

b. Test results

The test results are shown in Table 10 hereinbelow.

TABLE 10

| Olfactive performance of E/Z)-2-acetyl-4-methyltridec-2-enoate according to the invention | | | |
|---|---|---|---|
| Overall Perfume Intensity | Line Drying | | |
| Samples stored 2 weeks @ 37° C. | 1 day | 3 days | 7 days |
| Powder Detergent + 0.24% Perfume D | 1.72 | 2.04 | 2.18 |
| Powder Detergent + 0.52% starch matrix granules A containing 46% of Perfume D (i.e. 0.24% encapsulated Perfume D) | 1.8 | 2.62 | 2.64 |

c. Conclusions

While there is an almost parity performance on 1 day dry, perfume intensity on days 3 and 7 on dry fabrics is perceived higher for a powder detergent containing perfume D into the starch matrix Example 9: Olfactive performance of 3-(Dodecylthio)-1-(2,6,6-trimethyl-3-cyclohexen-1-yl)-1-butanone in powder detergent a. Composition and Test protocol The composition and Test protocol of Example 9 is according to Example 5 hereinabove.

b. Test results

The results are shown in Table 11 hereinbelow.

TABLE 11

| Olfactive performance of 3-(Dodecylthio)-1-(2,6,6-trimethyl-3-cyclohexen-1-yl)-1-butanone according to the invention | | | |
|---|---|---|---|
| Overall Perfume Intensity | Line Drying | | |
| Samples stored 2 weeks @ 37° C. | 1 day | 3 days | 7 days |
| Powder Detergent + 0.23% Perfume E | 1.69 | 1.76 | 1.79 |
| Powder Detergent + 0.5% starch matrix granules A containing 46% of Perfume E (i.e. 0.23% encapsulated Perfume B) | 2.37 | 2.9 | 3.12 |
| Powder Detergent + 3.83% PEG granules containing 6% of Perfume E (i.e. 0.23% encapsulated Perfume E) | 2.31 | 3.37 | 3.52 |
| Powder Detergent + 3.54% sodium carbonate mix containing 6.5% of Perfume E (i.e. 0.23% encapsulated Perfume E) | 1.6 | 1.82 | 1.85 |

PEG granule preparation:

The granulated PEG base formula with the following final composition was prepared.

| Ingredients | Part |
|---|---|
| PEG 4000-7500 | 68 |
| Dextrose | 26 |
| Perfume B | 6 |

To the PEG base, 26% of dextrose were added and the mixture was melted at 80° C. Then 6% of perfume E were added and mixed. Finally, the lipase was added in either granulated or liquid form, and gently mixed to maintain the integrity of the lipase granules. The mix is then pelletised while cooling, by pouring a thin film of the molten mixture on a flat surface, and cutting it in smaller pieces after solidification.

Sodium Carbonate Mix was Prepared According to P&G Patent US 2003/0171250 A1.

80 g of dispersant Neodol 91-8 (966461) was heated at 70° C. in bain marie. Out of the bain marie, 20 g of the perfume oil was added and then mixed with Ultraturrax at 9000 RPM for 2 min. This mix was put back in the 70° C. bain marie for 1-2 min in order to have a limpid liquid. This liquid was then poured in 200 g of fine sodium carbonate (soda ash from Solvay) by controlling the weigh introduced: 97 g of the solution was poured in the sodium carbonate. Then the mixture was mixed with a glass stick and stir 10 min in Turbula mixer (in a 500 mL glass jar with twist off cap).

c. Conclusions

After 2 weeks storage of the detergent at 37° C., performance on dry fabrics from perfume E added as free oil is perceived at parity with the one delivered via the carrier sodium carbonate mix and they both score much lower than if perfume E had been either encapsulated in a starch matrix or contained in a PEG granules base.

Example 10: Olfactive performance of 1-methoxy-4-[3-methyl-4-(2-phenylethoxy)-3-buten-1-yl)benzene in powder detergent a. Composition and Test protocol The composition and Test protocol of Example 10 is according to Example 5 hereinabove.

b. Results

The results are shown in table 12 hereinbelow

TABLE 12

Olfactive performance of 1-methoxy-4-[3-methyl-4-(2-phenylethoxy)-3-buten-1-yl)benzene according to the invention

| Overall Perfume Intensity | Line Drying | | |
|---|---|---|---|
| Samples stored 1 weeks @ 50° C. | 1 day | 3 days | 7 days |
| Powder Detergent + 0.23% Perfume F | 2.01 | 1.75 | 2.11 |
| Powder Detergent + 0.5% starch matrix granules | 2.56 | | |
| A containing 46% of Perfume F (i.e. 0.23% encapsulated Perfume B) | | 2.51 | 2.8 |

c. Conclusions

Perfume Intensity on dry fabrics is perceived significantly stronger when perfume F is protected into the starch matrix Example 11: Olfactive performance in solid scent booster a. Protocol Solid scent booster compositions given in Table 13 were homogenized by powder mixing, and exposed to accelerated aging by storage in closed containers during 2 weeks at 45° C.

TABLE 13

Urea-based solid scent booster compositions

| Ingredients | Composition 1 | Composition 2 |
|---|---|---|
| Urea (beads) | 94 | 91 |
| Bentonite | 3 | 3 |
| Perfume B | 3 | — |
| Starch matrix granules B containing 48.5% of Perfume B | — | 6 |

A load of towels (24) was washed with 36 g of unperfumed detergent and 18 g of aged solid scent booster composition 1 or 2 (Table 13) added in the drum. A short cotton program was used at 40° C., with 3 rinses and 900 tpm spinning. The towels were line-dried for 24 hours. Panelists evaluated the odor after 1 day line-drying, and after 3 and 7 days storage in aluminum foil.

Evaluation Scale:

1=no odor; 2=just perceptible; 3=weak; 4=moderate; 5=strong; 6=very strong; 7=Extremely Strong b. Test results The intensity of the perception of the perfume on dried towels treated with the scent booster compositions 1 and 2 was evaluated by a panel of 6 to 8 trained panelists. The results are shown in FIG. 1.

c. Conclusion

After 2 weeks storage of the solid scent booster at 45°, performance on dry fabric from perfume B added as free oil (composition 1) is consistently perceived lower than for perfume B encapsulated in a starch matrix (composition 2).

The invention claimed is:

1. A fragrance delivery system comprising a perfume oil, and a carrier material, wherein the perfume oil comprises at least one pro-perfume compound, and wherein the perfume oil is entrapped within a matrix formed by the carrier material, wherein the fragrance delivery system is a solid fragrance delivery system; and wherein the pro-perfume compound is a compound of formula

(I)

wherein:

a) w represents an integer from 1 to 10000;

b) n represents 1 or 0;

c) m represents an integer from 1 to 4;

d) P represents a hydrogen atom or a radical susceptible of generating an odoriferous α,β-unsaturated ketone, aldehyde or carboxylic ester and is represented by the formula

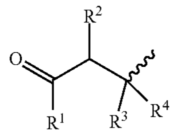
(II)

in which the wavy line indicates the location of the bond between said P and X;

$R^1$ represents a hydrogen atom, a $C_1$ to $C_6$ alkoxyl radical or a $C_1$ to $C_{15}$ linear, cyclic or branched alkyl, alkenyl or alkadienyl radical, optionally substituted by $C_1$ to $C_4$ alkyl groups; and $R^2$, $R^3$ and $R^4$ represent a hydrogen atom, an aromatic ring or a $C_1$ to $C_{15}$ linear, cyclic or branched alkyl, alkenyl or alkadienyl radical, optionally substituted by $C_1$ to $C_4$ alkyl groups; or two, or three, of the groups $R^1$ to $R^4$ are bonded together to form a saturated or unsaturated ring having 5 to 20 carbon atoms and including the carbon atom to which said $R^1$, $R^2$, $R^3$ or $R^4$ groups are bonded, this ring being optionally substituted by $C_1$ to $C_8$ linear, branched or cyclic alkyl or alkenyl groups; and with the proviso that at least one of the P groups is of the formula (II) as defined hereinabove;

e) X represents a functional group selected from the group consisting of the formulae i) to xiv):

i)

ii)

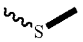

iii)

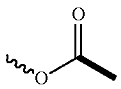

iv)

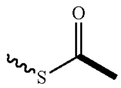

v)

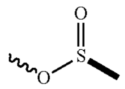

vi)

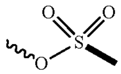

vii)

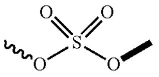

viii)

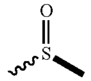

ix)

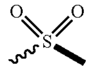

x)

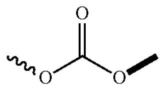

xi)

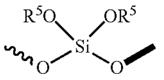

xii)

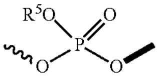

xiii)

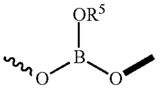

xiv)

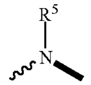

in which formulae the wavy lines are as defined previously and the bold lines indicate the location of the bond between said X and G, and R represents a hydrogen atom, a $C_1$ to $C_{22}$, saturated or unsaturated, alkyl group or an aryl group, optionally substituted by $C_1$ to $C_6$ alkyl or alkoxyl groups or halogen atoms; and with the proviso that X may not exist when P represents a hydrogen atom;

f) G represents a multivalent radical (with a m+1 valence) derived from an aryl radical, optionally substituted, or a divalent cyclic, linear or branched alkyl, alkenyl, alkadienyl or alkylbenzene hydrocarbon radical having from 1 to 22 carbon atoms, or a tri-, tetra- or pentavalent cyclic, linear or branched alkyl, alkenyl, alkadienyl or alkylbenzene hydrocarbon radical having from 1 to 22 carbon atoms, said hydrocarbon radical being optionally substituted and containing from 1 to 10 functional groups selected from the group consisting of ether, ester, ketone, aldehydes, carboxylic acids, thiols, thioethers, amine, quaternary amines and amides; optional substituents of G are halogen atoms, N02, $OR^6$, $NR^6 2$, $COOR^6$ or $R^6$ groups, $R^6$ representing a $C_1$ to $C_{15}$ alkyl or alkenyl group; and g) Q represents a hydrogen atom (in which case w=1 and n=1), or represents a group $[[P—X]_m[G]_n]$ wherein P, X, G, n and m are as defined previously (in which case w=1), or a dendrimer selected from the group consisting of the polyalkylimine dendrimers, amino acids (e.g. lysine) dendrimers, mixed amino/ether dendrimers and mixed amino/amide dendrimers, or a polysaccharide selected from the group consisting of cellulose, cyclodextrines and starches, or a cationic quaternised silicon polymer or still a polymeric backbone derived from a monomeric unit selected from the group consisting of the formulae A) to E) and mixtures thereof:

A)

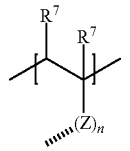

B)

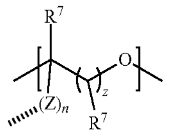

C)

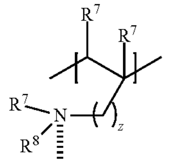

D)

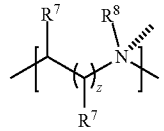

E)

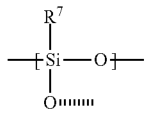

in which formulae the hatched lines indicate the location of the bond between said monomeric unit and G;

z represents an integer from 1 to 5;

n is defined as previously;

$R^7$ represents, simultaneously or independently, a hydrogen atom, a $C_1$-$C_{15}$ alkyl or alkenyl group, a $C_4$-$C_{20}$ polyalkyleneglycol group or an aromatic group;

$R^8$ represents, simultaneously or independently, a hydrogen or oxygen atom, a $C_1$-$C_5$ alkyl or glycol or does not exist; and Z represents a functional group selected from the group consisting of the formulae 1) to 8), the branching units of the formulae 9) to 11), and mixtures thereof:

1)

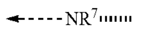

2)

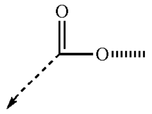

3)

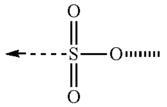

4)

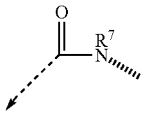

5)

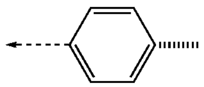

6)

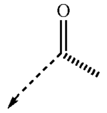

7)

8)

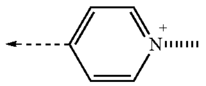

9)

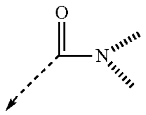

10)

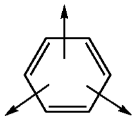

11)

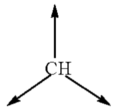

in which formulae the hatched lines are defined as previously, the dotted arrows indicate the location of the bond between said Z and the remaining part of the monomeric unit and the arrows indicate the location of the bond between said Z and either G or the remaining part of the monomeric unit, $R^7$ being as defined previously; and with the proviso that Z does not represent a group of formula 1), 3), and 7) if the monomeric unit is of formula B).

2. The fragrance delivery system according to claim 1, wherein the fragrance delivery system is in a form of a particle.

3. The fragrance delivery system according to claim 1, wherein the pro-perfume compound is a storage-labile pro-perfume compound.

4. The fragrance delivery system according to claim 1, wherein the carrier material is a polymeric carrier material.

5. The fragrance delivery system according to claim 1, wherein the perfume oil comprises 0.1 to 100 weight % of the pro-perfume compound, based on the total weight of the perfume oil.

6. The fragrance delivery system according to claim 1, wherein the fragrance delivery system comprises 20 to 70 weight % of the perfume oil based on the total weight of the fragrance delivery system.

7. The fragrance delivery system according to claim 1, wherein the fragrance delivery system comprises 0.02 to 50 weight % of the pro-perfume compound, based on the total weight of the fragrance delivery system.

8. A perfuming composition comprising a fragrance delivery system according to claim 1;

at least one ingredient selected from the group consisting of a perfumery carrier, a perfuming co-ingredient and a mixture thereof, and optionally, a perfumery adjuvant.

9. The perfuming composition according to claim 8, wherein the perfuming composition comprises 0.001 to 30 weight % of the fragrance delivery system, based on the total weight of the composition.

10. A perfumed consumer product comprising a fragrance delivery system according to claim 1.

11. The perfumed consumer product according to claim 10, wherein the perfumed consumer product is a dry perfumed consumer product.

12. The perfumed consumer product according to claim 10, wherein the perfumed product is selected from the group consisting of solid detergent, solid cleaning additives, bleach booster formulations or scouring powder with or without oxidizing agent and/or bleach, solid fabric softener, solid fabric boosters, solid skin, tablet dishwasher, hair or hand cleanser, dry shampoo and solid or low water antiperspirant and deodorants.

13. The perfumed consumer product according to claim 10, wherein the perfumed product comprises 0.001 to 30 weight % of the fragrance delivery system, based on the total weight of the perfumed product.

14. A perfumed consumer product comprising the composition according to claim 8.

15. The perfumed consumer product according to claim 14, wherein the perfumed consumer product is a dry perfumed consumer product.

16. The perfumed consumer product according to claim 15, wherein the perfumed product is selected from the group consisting of solid detergent, solid cleaning additives, bleach booster formulations or scouring powder with or without oxidizing agent and/or bleach, solid fabric softener, solid fabric boosters, solid skin, tablet dishwasher, hair or hand cleanser, dry shampoo and solid or low water antiperspirant and deodorants.

17. The perfumed consumer product according to claim 10, wherein the perfumed product comprises 0.001 to 30 weight % of the fragrance delivery system, based on the total weight of the perfumed product.

18. The fragrance delivery system according to claim 1, wherein the pro-perfume compound is a temperature-labile, photo-labile, moisture-labile and/or oxygen-labile pro-perfume compound.

19. The fragrance delivery system according to claim 1, wherein the carrier material is a polymeric carrier material comprising polyvinyl acetates, polyvinyl alcohol, dextrines, maltodextrines, glucose syrups, natural or modified starch, polysaccharides, carbohydrates, chitosan, gum Arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, vegetable gums, gum acacia, pectins, xanthanes, alginates, carragenans or cellulose derivatives, carboxymethyl methylcellulose, methylcellulose or hydroxyethyl cellulose, or mixtures thereof.

* * * * *